US 9,443,673 B2

United States Patent
Chu et al.

(10) Patent No.: US 9,443,673 B2
(45) Date of Patent: Sep. 13, 2016

(54) FLEXIBLE KEYBOARD ASSEMBLY

(71) Applicant: Logitech Europe S.A., Lausaunne (CH)

(72) Inventors: Pai-Cheng Chu, Yuanlin Township (TW); Tzu-Pin Lin, Taipei (TW); Chih-Wei Chen, Zhongli (TW); Richard Milhe, Divonnes-les-Bains (FR)

(73) Assignee: Logitech Europe S.A., Lausanne (CH)

( * ) Notice: Subject to any disclaimer, the term of this patent is extended or adjusted under 35 U.S.C. 154(b) by 394 days.

(21) Appl. No.: 13/854,112

(22) Filed: Mar. 31, 2013

(65) Prior Publication Data

US 2014/0069791 A1    Mar. 13, 2014

Related U.S. Application Data

(60) Provisional application No. 61/802,238, filed on Mar. 15, 2013, provisional application No. 61/699,856, filed on Sep. 11, 2012.

(51) Int. Cl.
*H01H 13/06* (2006.01)
*H01H 13/704* (2006.01)
(Continued)

(52) U.S. Cl.
CPC .......... *H01H 13/704* (2013.01); *G06F 1/1628* (2013.01); *G06F 1/1669* (2013.01); *H01H 3/125* (2013.01); *H01H 13/83* (2013.01); *H01H 13/86* (2013.01); *H01H 13/88* (2013.01); *H01H 2009/187* (2013.01); *H01H 2203/0085* (2013.01); *H01H 2209/002* (2013.01); *H01H 2209/026* (2013.01); *H01H 2209/068* (2013.01); *H01H 2215/006* (2013.01); *H01H 2215/036* (2013.01); *H01H 2219/028* (2013.01);
(Continued)

(58) Field of Classification Search
CPC ............... H01H 3/125; H01H 13/704; H01H 2229/028; H01H 2229/044; H01H 2237/004
USPC .......................... 200/344, 5 A, 302.1, 302.2
See application file for complete search history.

(56) References Cited

U.S. PATENT DOCUMENTS 7,262,374 B2    8/2007  Takatsuka et al.
7,271,361 B2    9/2007  Sugimura et al.
(Continued)

OTHER PUBLICATIONS

U.S. Appl. No. 13/854,118, Non-Final Office Action mailed on Apr. 28, 2015, 10 pages.
(Continued)

*Primary Examiner* — Edwin A. Leon
*Assistant Examiner* — Ahmed Saeed
(74) *Attorney, Agent, or Firm* — Kilpatrick Townsend & Stockton LLP

(57) ABSTRACT

Embodiments of the invention are directed to a method of assembling a folio case. The method comprises molding a set of molded key caps over a flexible fabric layer to form a fabric key cap layer, where the key caps do not pass through the flexible fabric layer. The method further comprises affixing a first portion of the flexible key cap layer opposite the set of molded key caps to an interior portion of a housing, and affixing an intermediate layer between the interior portion of the housing and a second portion of the fabric key cap layer corresponding to the set of molded key caps opposite the first portion. The method further comprises attaching a first portion of a holder to the first portion of the flexible key cap layer configured to receive a computing device, wherein a second portion of the holder is not fixedly attached to the flexible key cap layer.

13 Claims, 32 Drawing Sheets

(51) Int. Cl.
    *H01H 13/88* (2006.01)
    *G06F 1/16* (2006.01)
    *H01H 13/83* (2006.01)
    *H01H 3/12* (2006.01)
    *H01H 13/86* (2006.01)
    *H01H 9/18* (2006.01)

(52) U.S. Cl.
    CPC .... *H01H2221/05* (2013.01); *H01H 2223/046* (2013.01); *H01H 2223/05* (2013.01); *H01H 2223/052* (2013.01); *H01H 2229/006* (2013.01); *H01H 2229/028* (2013.01); *H01H 2229/044* (2013.01); *H01H 2237/004* (2013.01); *Y10T 29/49105* (2015.01); *Y10T 29/49826* (2015.01)

(56) References Cited

U.S. PATENT DOCUMENTS

| | | |
|---|---|---|
| 2004/0159762 A1 | 8/2004 | Ghosh |
| 2004/0169995 A1 | 9/2004 | Ghosh et al. |
| 2006/0007645 A1 | 1/2006 | Chen et al. |
| 2007/0206346 A1 | 9/2007 | Okuley et al. |
| 2008/0017495 A1 | 1/2008 | Tateda et al. |
| 2010/0232861 A1 | 9/2010 | Shibata et al. |
| 2011/0284420 A1 | 11/2011 | Sajid |
| 2012/0140396 A1 | 6/2012 | Zeliff et al. |
| 2013/0233685 A1 | 9/2013 | Zhang |
| 2014/0069791 A1 | 3/2014 | Chu et al. |
| 2014/0069792 A1 | 3/2014 | Bates et al. |
| 2014/0071654 A1 | 3/2014 | Chien et al. |
| 2014/0262715 A1 | 9/2014 | Lee et al. |

OTHER PUBLICATIONS

"Keycase for Logitech," product review Ideo.com (2001).

U.S. Appl. No. 13/854,118, Final Office Action mailed on Oct. 21, 2015, 9 pages.

First Office Action for CN Application No. 201310412960.4, mailed Feb. 26, 2016, with English Translation, 3 pages.

Non-Final Office Action for U.S. Appl. No. 13/854,118, mailed Apr. 5, 2016, 7 pages.

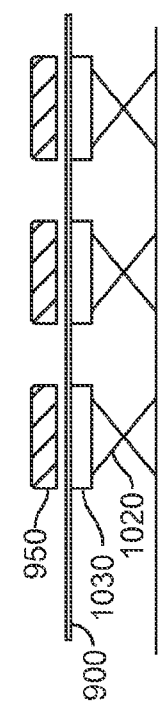
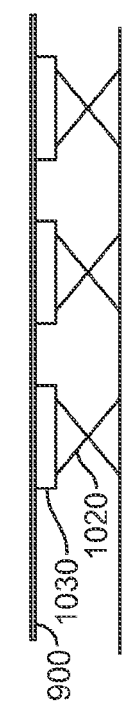
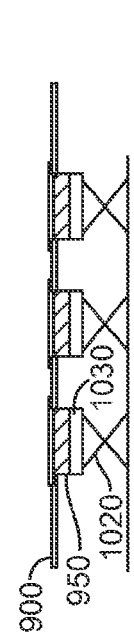
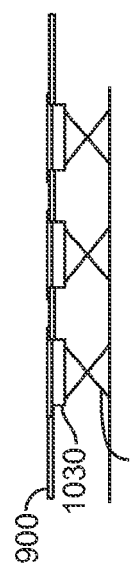
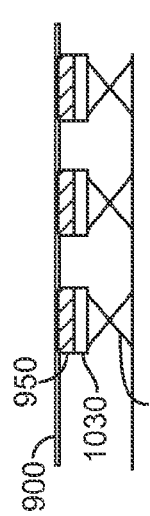
FIG. 11F  FIG. 11G  FIG. 11H  FIG. 11I  FIG. 11J
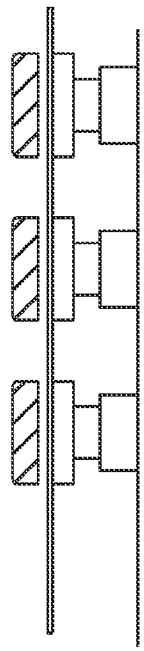
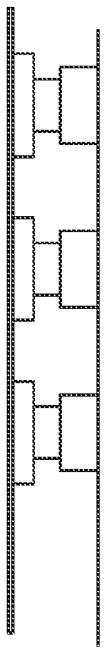
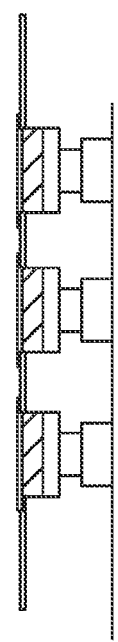
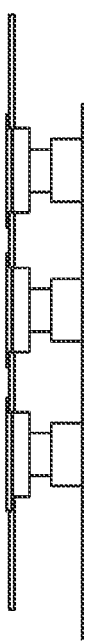
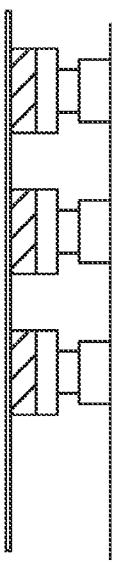
FIG. 11A  FIG. 11B  FIG. 11C  FIG. 11D  FIG. 11E

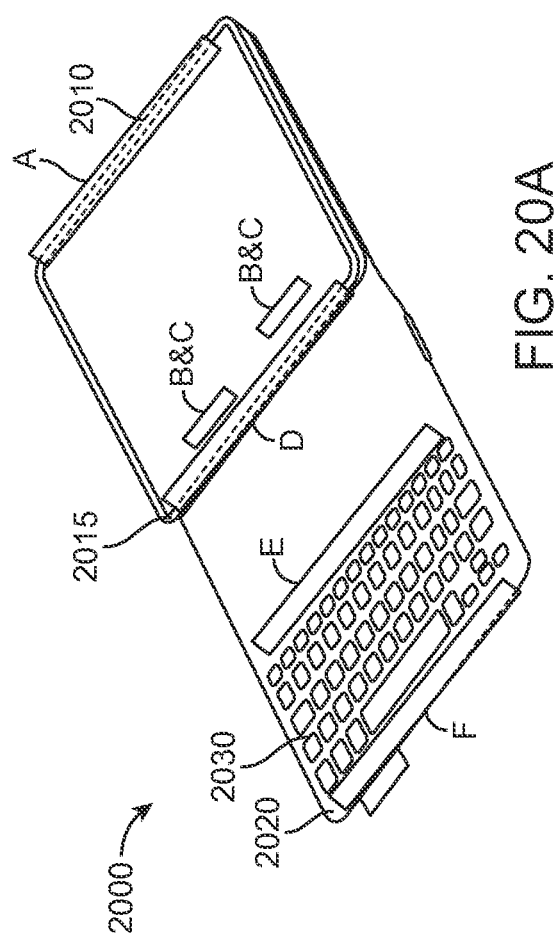
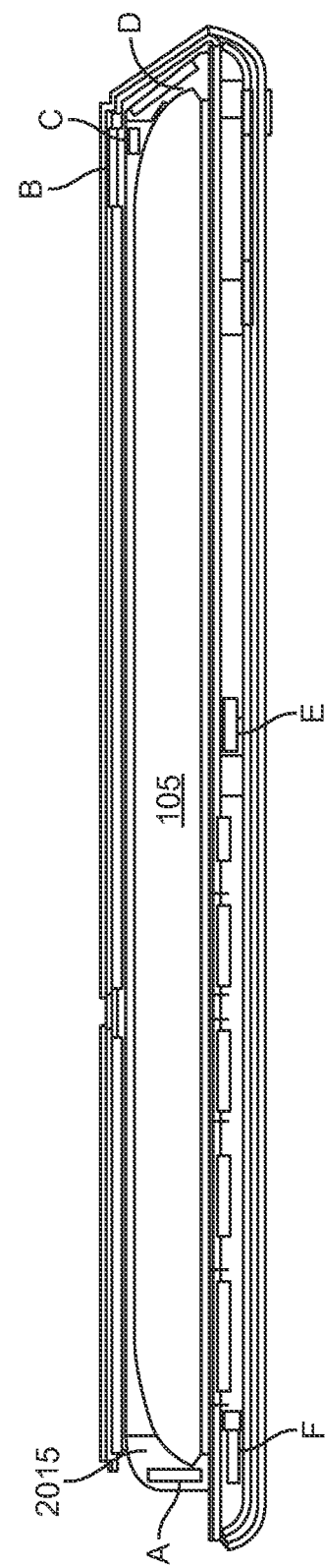
FIG. 20A
FIG. 20B

Keyframe module overview

| modules \ items | Scissors type | Dome type | |
|---|---|---|---|
| | Fabric | Rubber keyframe | Logitech Ultra Slim |
| Picture |  | |  |
| Travel (mm) | 1.3 / Icon (less is better) | 0.3 ~ 0.4 | 0.5 ~ 0.8 |
| avg P. F. (gf) | 65 + (~15) | 65 (+/- 20) | 60 (+/- 20, TBC) |
| Key pitch (mm) | 19 | 16 ~ 19 | 16 ~ 19 |
| (M)Thickness (mm) | 3.5 / Icon (+fabric/key: ~5) | 2.0 ~ 3.0 (+skin: 2.5 ~ 3.5) | 2.5 ~ 3.5 (cap: +1.0, no EE) |
| Tactile Fbk. (Reda : 5, virtual KBD : 0) | Icon: (2~3) (~4) | (2) | (4) |

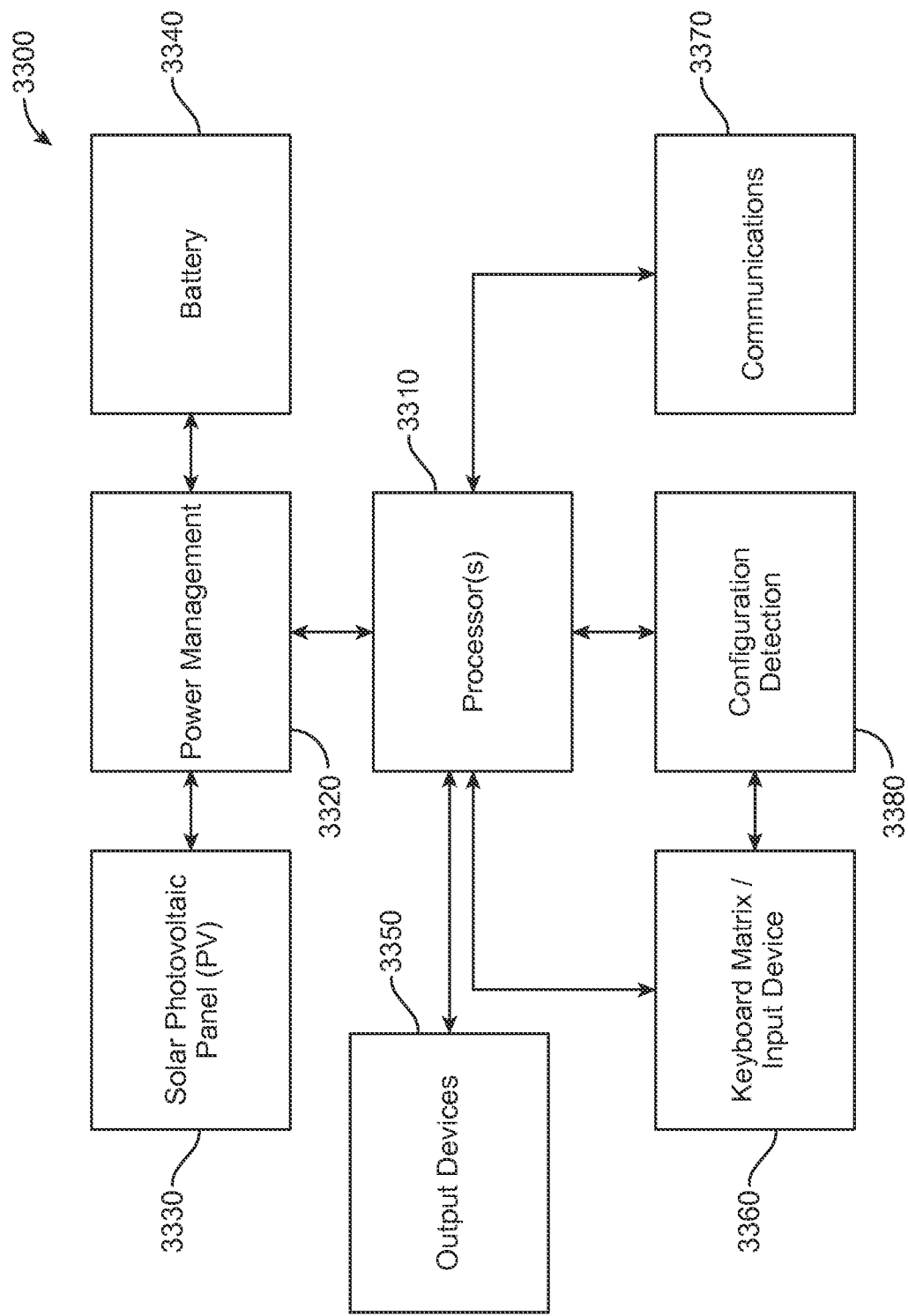

FLEXIBLE KEYBOARD ASSEMBLY

CROSS-REFERENCES TO RELATED APPLICATIONS

The present non-provisional application claims benefit under 35 U.S.C. §120 of U.S. Provisional Patent Application No. 61/699,856, filed on Sep. 11, 2012, and entitled "Protective Cover for a Mobile Input Device," and U.S. Provisional Patent Application No. 61/802,238, filed on Mar. 15, 2013, and entitled "A Folio for a Tablet Computing Device," both of which are incorporated by reference in their entirety for all purposes.

The following regular U.S. patent applications (including this one) are being filed concurrently, and the entire disclosure of the other applications are incorporated by reference into this application for all purposes:

Application Ser. No. 13/854,118, titled, "Protective Cover for a Tablet Computer," filed Mar. 31, 2013;
Application Ser. No. 13/854,125, titled, "Keyframe Modules for a Flexible Keyboard," filed Mar. 31, 2013;
Application Ser. No. 13/854,123, titled, "Systems and Methods for Imprinting Font on a Key Cap," filed Mar. 31, 2013;
Application Ser. No. 13/854,120, titled, "Protective Cover for a Tablet Computer," filed Mar. 31, 2013;
Application Ser. No. 13/854,116, titled, "Protective Cover for a Tablet Computer," filed Mar. 31, 2013.

BACKGROUND

Modern tablet computers not only provide convenience to users in terms of portability, but are also capable of various enhanced functionalities. Users may rely on tablet computers to perform their day-to-day functions, such as e-mailing, word processing, Web browsing, media playing, image and audio editing, etc. The virtual keyboard or physical keypads available on the table computers are often difficult to manipulate and can be difficult to get accustomed to. While portable keyboards can be connected to tablet computers, they are often bulky and rigid. Portable keyboards with a more flexible shell and with smaller form factors often provide poor tactile feedback such that the user's desire to type on the portable keyboards extensively would be minimal. Further, it can be difficult to produce good color contrast and high resistance to abrasion for letters and numbers on keycaps.

BRIEF SUMMARY

According to an embodiment of the present invention, a method of assembling a folio case is provided. The method comprises molding a set of molded key caps over a flexible fabric layer to form a fabric key cap layer, where the key caps do not pass through the flexible fabric layer. The method further comprises affixing a first portion of the flexible key cap layer opposite the set of molded key caps to an interior portion of a housing, and affixing an intermediate layer between the interior portion of the housing and a second portion of the fabric key cap layer corresponding to the set of molded key caps opposite the first portion. The method further comprises attaching a first portion of a holder to the first portion of the flexible key cap layer configured to receive a computing device, wherein a second portion of the holder is not fixedly attached to the flexible key cap layer.

In further embodiments, the method of assembling the folio case also comprises placing an adhesive on a plurality of locations of the fabric key cap layer, wherein each of the plurality of locations corresponds to a center of a corresponding molded key cap on the intermediate layer. In some embodiments of the present invention, the placement of the adhesive for the corresponding set of keys disposed on the fabric key cap layer is limited to a threshold of less than half of the size of the corresponding set of keys disposed on the intermediate layer. In other embodiments of the present invention the placement of the adhesive for the corresponding set of keys disposed on the fabric key cap layer is limited to an area of approximately 5 mm in diameter. In some embodiments, the intermediate layer is composed of one or more of set of keys disposed on the intermediate layer, a circuit board, and a power source. In some embodiments, the set of keys may have a scissor and dome structure. In some embodiments, the set of keys have a metal dome structure.

According to embodiments of the present invention, the fabric key cap layer is formed by molding the set of molded key caps over the flexible fabric layer. In further embodiments, the housing is attached to the fabric key cap layer with an adhesive along a portion of the housing and the fabric key cap layer opposite from the portion of the fabric key cap layer with the set of molded key caps disposed thereon. According to further embodiments, placement of the adhesive on the plurality of locations of the fabric key cap layer corresponds to the placement of the set of molded key caps on the fabric key cap layer Further embodiments include a apparatus comprising a set of input structures disposed on a support base fixedly attached to an intermediate layer. The intermediate layer includes one or more circuit boards, power sources, and magnets. The apparatus can further include a first set of molded key caps on each input structure in the set of input structures. The apparatus can further include a second set of molded key caps disposed on a flexible fabric. In embodiments of the present invention, the flexible fabric is bonded to the first set of molded key caps. The placement of the second set of molded key caps on a flexible fabric corresponds to the placement of the first set of molded key caps on the intermediate layer. According to further embodiments, the input structures are input keys capable of providing instructions to a computing device.

According to further embodiments, the flexible fabric is bonded to the first set of molded key caps by an adhesive disposed on the flexible fabric at locations corresponding to each of the key caps in the first set of molded key caps, and wherein the flexible fabric is bonded with a top case to form a flexible fabric layer. According to further embodiments of the apparatus, the second set of molded key caps disposed on the flexible fabric do not pass through the flexible fabric.

The flexible fabric can be held in tension and may deform when at least one of the plurality of key caps are depressed. In some aspects, the flexible fabric is generally planar, but can be configured in a variety of shapes (e.g., polygons, spherical or elliptical permutations, planes, etc).

According to further embodiments, an amount of adhesive disposed on the flexible fabric is sufficient to bond to the first set of molded key caps to the second set of molded key caps. Pressing on one of the molded key caps in the second set of molded key caps does not affect more than the one of the molded key caps in the first set of molded key caps affixed to the pressed molded key cap.

Furthermore, according to further embodiments, the intermediate layer is affixed to a housing. In certain embodiments, the holder affixed to the flexible fabric is configured to hold a computing device.

According to further embodiments, the second set of molded key caps disposed on the flexible fabric are comprised of a flexible material. In certain embodiments, the flexible material of the second set of molded key caps disposed on a flexible fabric is a polyurethane (PU). In certain embodiments, the flexible material of the second set of molded key caps is made of a different material than the flexible fabric layer.

BRIEF DESCRIPTION OF THE DRAWINGS

Various embodiments in accordance with the present disclosure will be described with reference to the drawings, in which:

FIGS. 11A-J illustrate a number of individual keys with PU key caps, a fabric keyframe, keycaps disposed underneath (or alternatively within) the keyframe, and scissor keys, according to an embodiment of the invention.

FIGS. 20A and 20B depict a plurality of magnets embedded in a folio tablet cover 2000, according to an embodiment of the invention.

FIG. 33 is a simplified block diagram of an exemplary system configured to operate the various protective cover systems discussed herein, according to certain embodiments of the invention.

DETAILED DESCRIPTION

Embodiments of the invention are directed to a folio-style protective case for a tablet computing device. In some embodiments, the protective case can include a flexible fabric keyboard that can be constructed by a set of molded key caps to a fabric skin layer. The molded key caps can be made from polyurethane (PU). A flexible fabric keyboard with molded key caps made from a combination of PU and other materials can provide flexibility while preserving structural integrity such that an optimal typing force for a user can be achieved.

Figure 1:
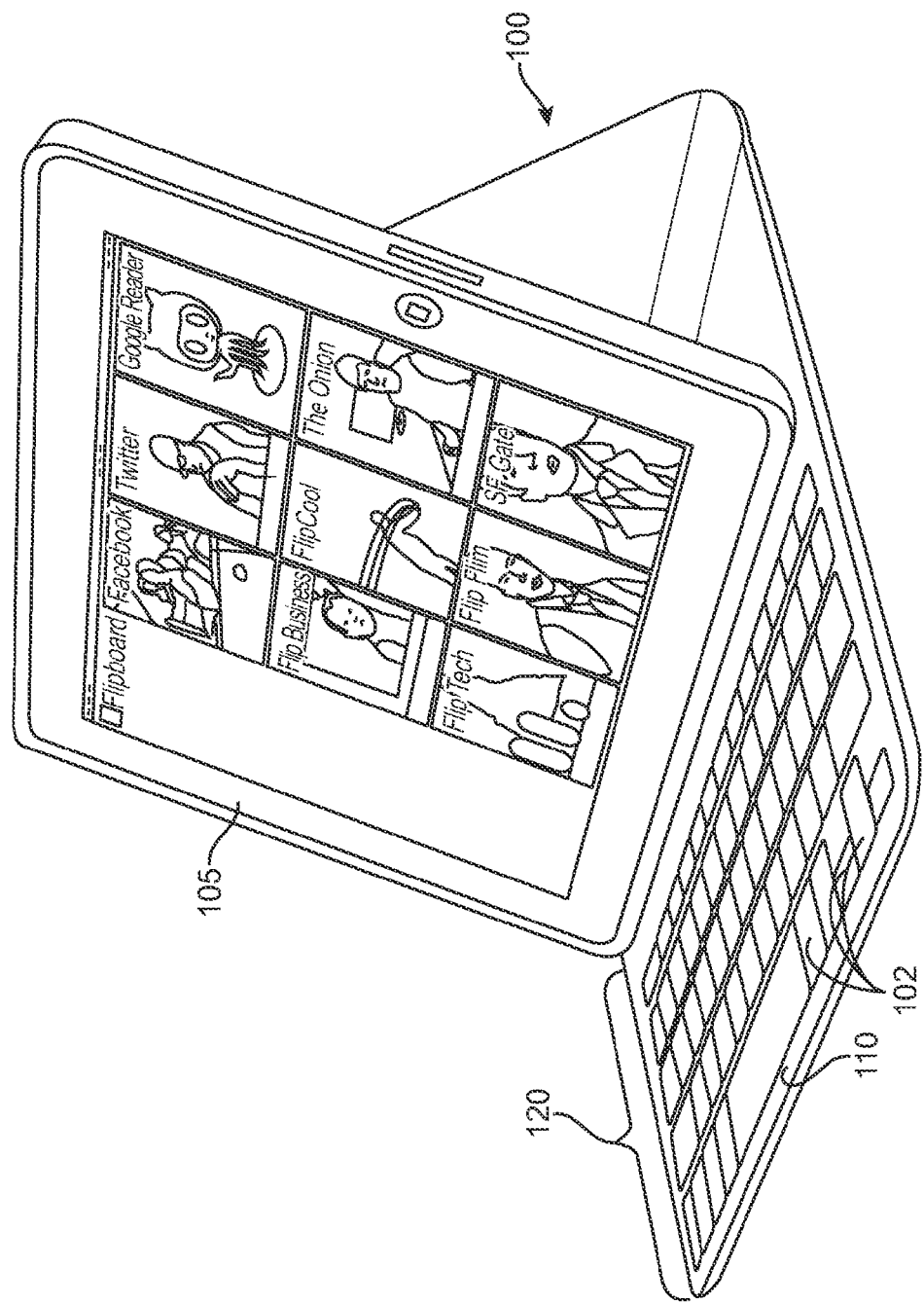
FIG. 1 illustrates a folio-style protective cover ("folio tablet cover") for a tablet computer, according to an embodiment of the invention.

FIG. 1 illustrates a folio-style protective cover ("folio tablet cover") 100 for a tablet computer 105, according to an embodiment of the invention. The folio tablet cover 100 can include a keyboard apparatus 120 with a soft key frame 110. The key frame 110 can be comprised of fabric, rubber, plastic, or the like. The individual keyboard keys 102 can be embedded in the fabric. In other words, the keycaps for each individual key 102 can be molded to the fabric itself. In some embodiments, the fabric can have a certain elasticity that is over molded with a plastic or rubber material in the shape of the keycaps. In some cases, the plastic material is attached to the key frame structure (e.g., glued, sewed, bonded, mechanically attached, etc.) and integrated with the housing.

Some embodiments use PU material in assembling a tablet folio and/or a keyboard. In some embodiments, the PU resin is a mixture of aliphatic and aromatic polyol reacting with isocyanate. In certain embodiments, PU can be used in the frame fabric and/or in the key caps themselves. By using a laser marking process that includes using a right laser source, lasering parameters, in combination with the right PU formula with laser additives of the right concentration, some embodiments can achieve the desired font color, or the optimal color contrast for glyphs and characters on the key cap. The laser marking process can facilitate font printing with the right color contrast on PU key caps while ensuring the longevity of the font color printed on the key caps.

Folio Tablet Cover Construction

Figure 2:
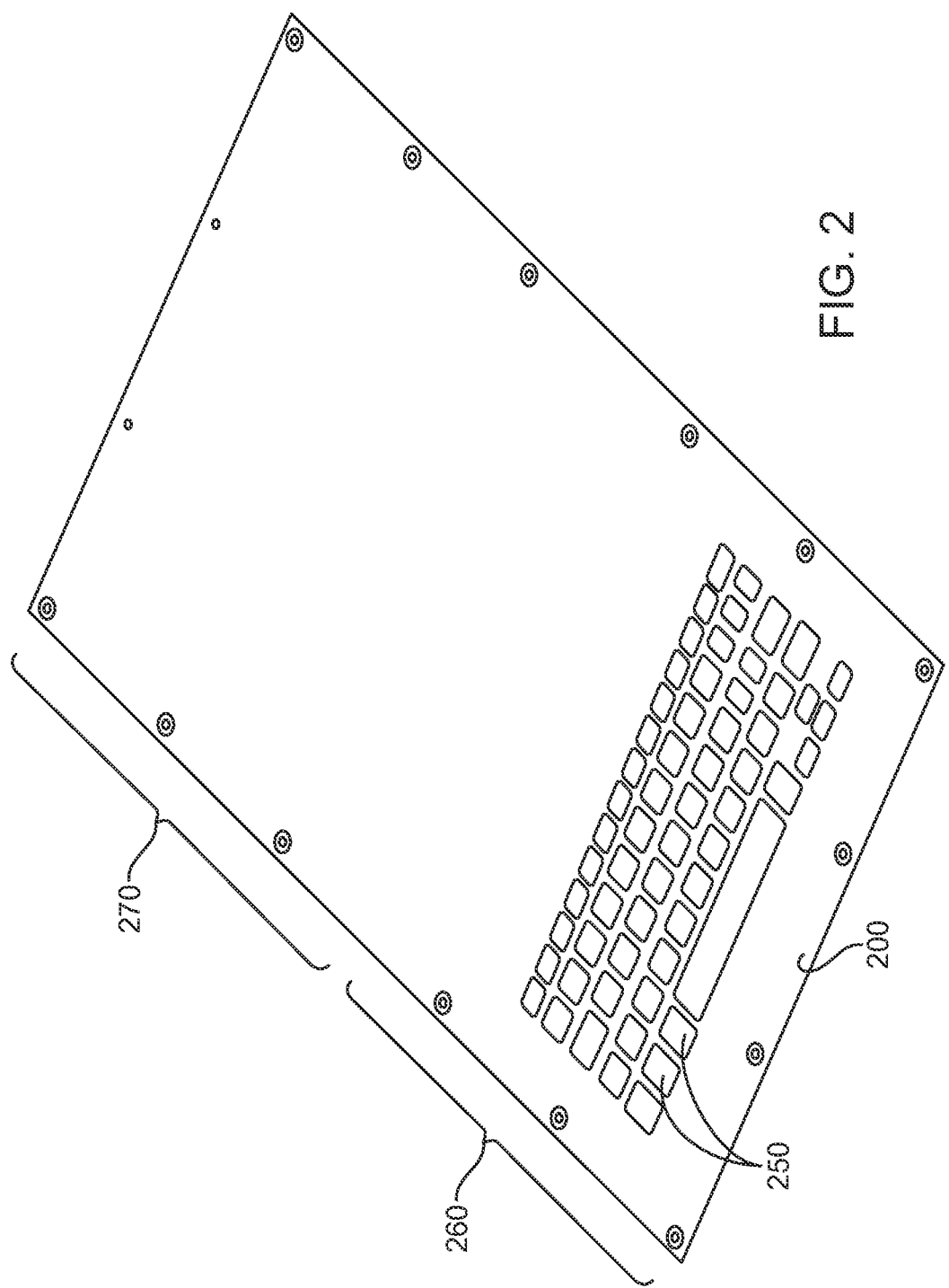
FIG. 2 illustrates a fabric layer with a number of key caps disposed thereon, according to an embodiment of the invention.
Figure 3:
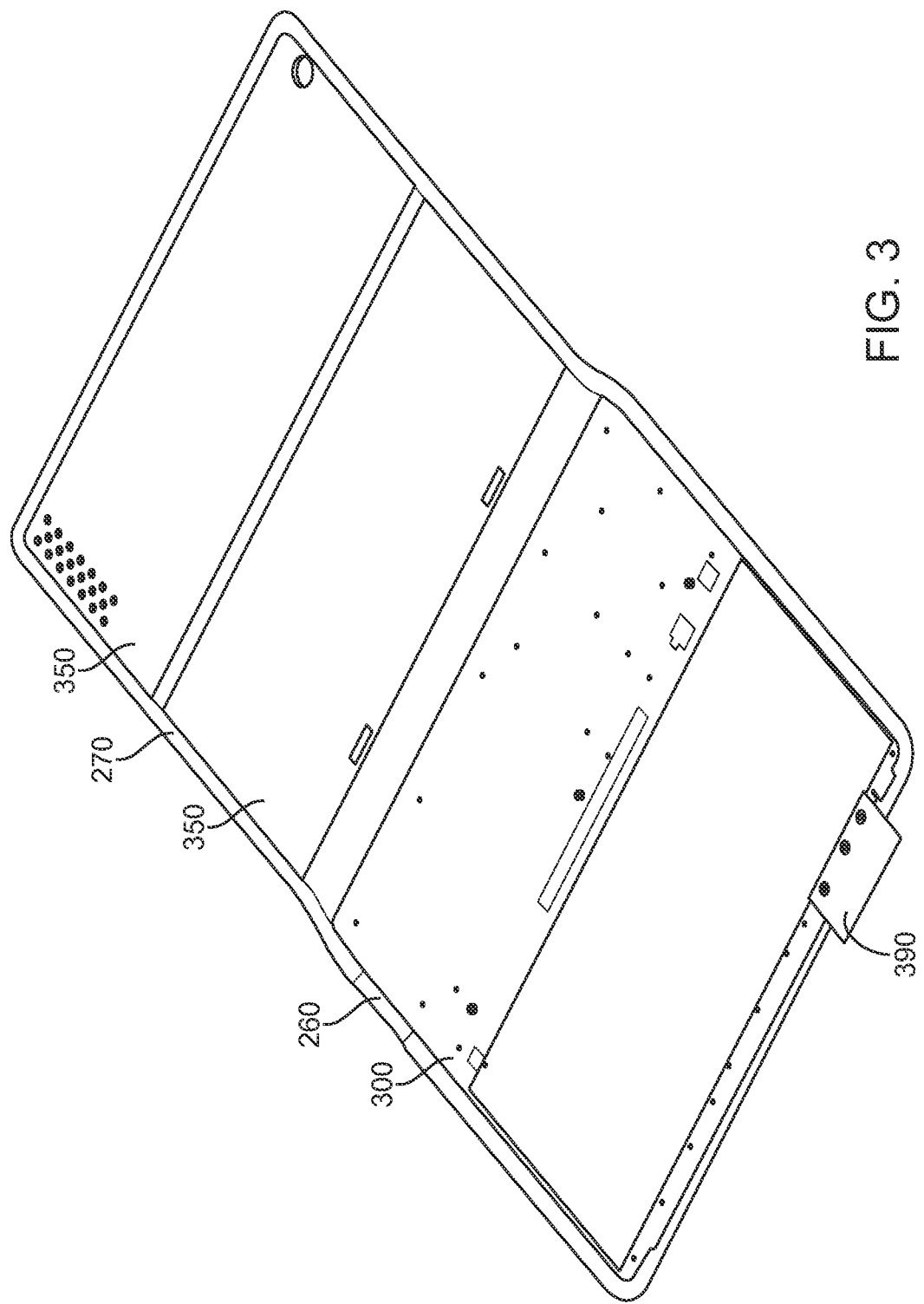
FIG. 3 illustrates a top case and glass fiber panels coupled to inner fabric layer of a folio tablet cover, according to an embodiment of the invention.
Figure 4:
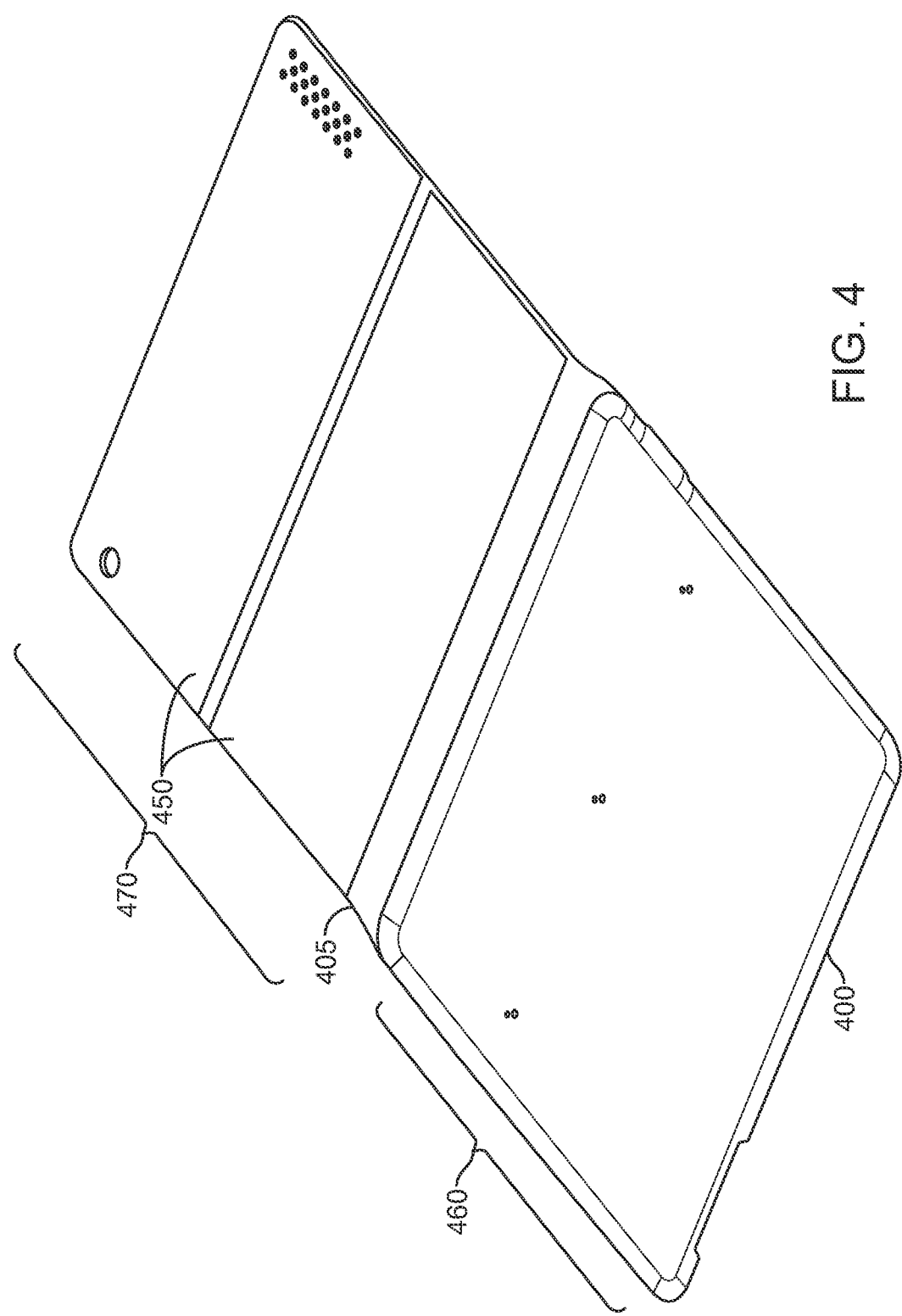
FIG. 4 illustrates an outer folio for a folio tablet cover, according to an embodiments of the invention.
Figure 5:
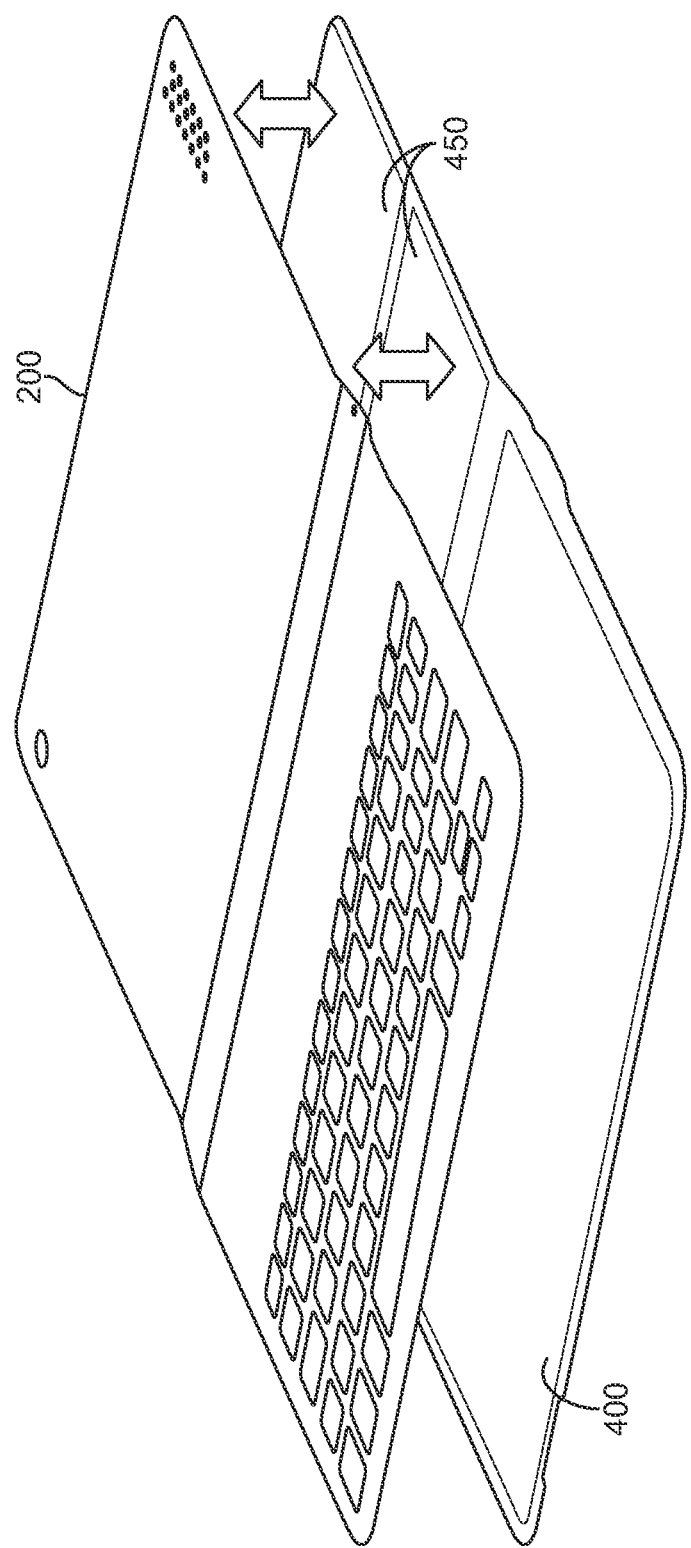
FIG. 5 illustrates the process of coupling outer folio to fabric layer, according to an embodiment of the invention
Figure 6:
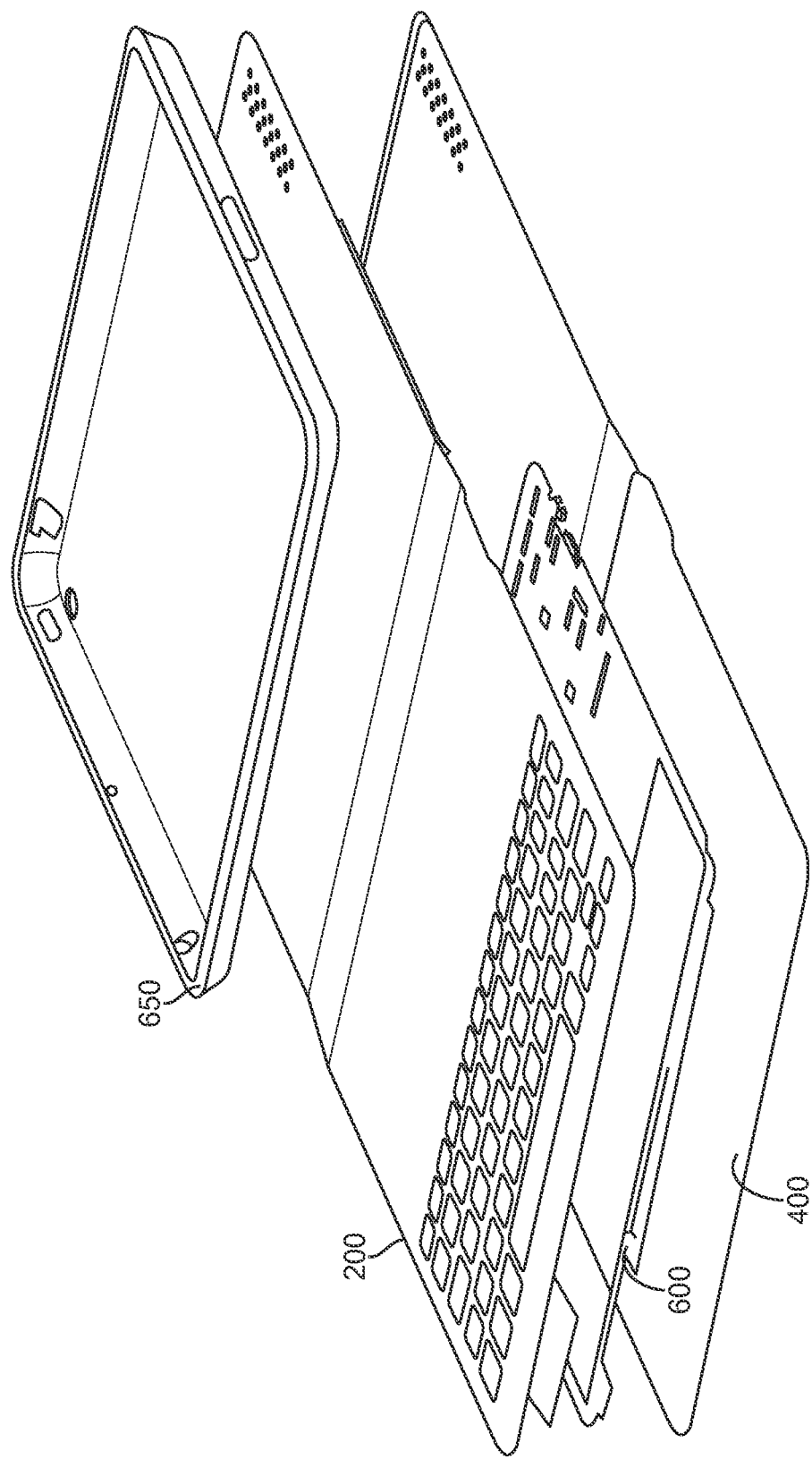
FIG. 6 illustrates the process of coupling a mid-case between the fabric layer and outer folio, according to an embodiment of the invention.
Figure 7:
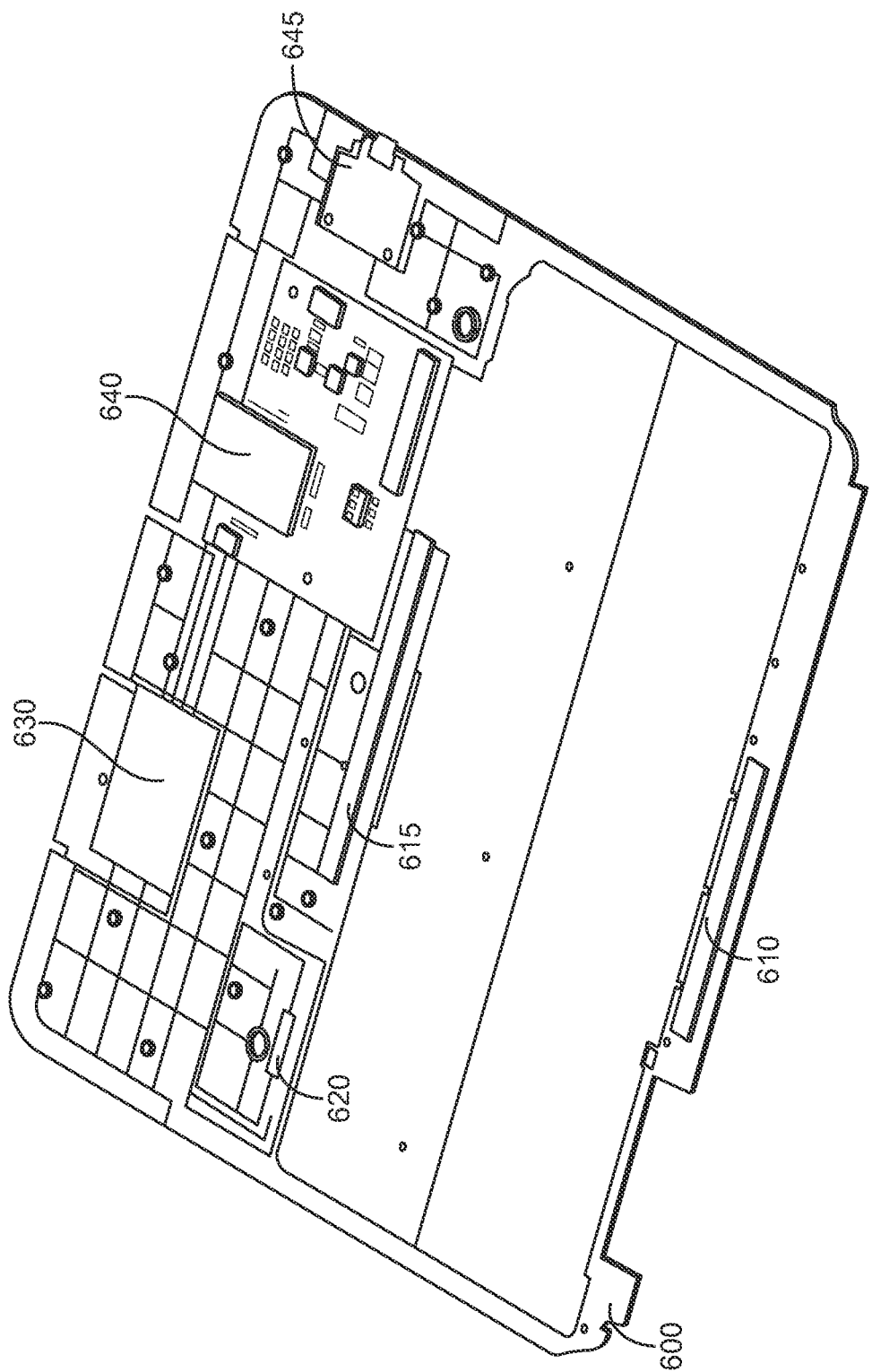
FIG. 7 illustrates the process of populating the mid-case with various components, according to an embodiments of the invention.

A number of steps and processes are involved in forming the structure of folio tablet cover 100 in FIG. 1. In one exemplary process, the first step includes forming the inner fabric and integrated keycap layer, as depicted in FIG. 2. The second step can include integrating a top case and glass fibers with the inner fabric, as shown in FIG. 3. The third step can include attaching or coupling a outer folio to an outer fabric portion, as shown in FIG. 4. The outer folio can be the outer folio portion of the folio tablet cover 100. The fourth step can include attaching the outer fabric to the inner fabric at the "north side"—or the end of the inner fabric opposite of the integrated key caps, as shown in FIG. 5. The fifth step can include coupling (e.g., by adhesive) a mid-case to the underside of the inner folio at its "south side" and coupling the opposite side of the mid-case to the outer folio, as shown in FIG. 6. Step five can further include coupling a holder (configured to hold a tablet computer) to the north side of the inner folio. The sixth step can include placing (e.g., integrating) the various electronic components in the mid-case, such as the printed circuit boards (PCBs), battery, etc., as shown in FIG. 7. The various layers are then sealed together (e.g., via glue, hardware, pins, tape, or other adhesive or fastening means) to form the complete folio tablet cover 100, as shown in FIG. 1.

FIG. 2 illustrates a fabric layer 200 with a number of key caps 250 disposed thereon, according to an embodiment of the invention. The fabric layer may also be referred to as a fabric keycap layer 200. Fabric layer 200 can be a key frame. Fabric layer 200 can be an inner fabric layer of a folio tablet cover (e.g., folio tablet cover 100 in FIG. 1). Inner fabric layer 200 includes a "south side" 260 that includes key caps 250, and a "north side" 270, as shown in FIG. 2. The key caps 250 can be composed of a molded polyurethane (PU). Alternatively, key caps 250 can be comprised of any suitable rubber or plastic compound, such as, but not limited to, ABS plastic, neoprene, nylon, or any suitable material that would be appreciated by one of ordinary skill in the art.

FIG. 3 illustrates a top case 300 and glass fiber panels 350 coupled to inner fabric layer 200 of a folio tablet cover (e.g., folio tablet cover 100 in FIG. 1), according to an embodiment of the invention. Top case 300 is coupled to the south side 260 of inner fabric layer 200 and on the opposite side of key caps 250. In some embodiments, top case 300 can be coupled to inner fabric layer 200 with an adhesive (e.g., heat glue, tape). However, other coupling means may be used (e.g., mechanical means, hardware, clips, pins, etc.), as would be appreciated by one of ordinary skill in the art. The glass fiber panels 350 are coupled to the north side 270 of inner fabric layer 200 with an adhesive (e.g., hot glue) or other suitable coupling means. In some embodiments, either glass fiber panels 350 or Polycarbonate (PC) films 450 may be attached to the top case 300. In other embodiments, any suitable material may be coupled to the top case 300. Tag 390 can be fastened to top case 300 by a mechanical means (e.g., screw, bolt) or by other suitable coupling means. Tag 390 may be used as a convenient feature to help open folio tablet cover 100 from a closed book configuration. Tag 390 may be made of leather, synthetic materials, or other suitable material. The fabric from inner fabric layer 200 can then be folded around the edge of the top case 300 and glass fabric panels 350 and fastened (e.g., glued) into place, as shown in FIG. 3.

FIG. 4 illustrates an outer folio 400 (or outer layer) for a folio tablet cover 100, according to an embodiments of the invention. Outer folio 400 can be made of any suitable plastic, metal, or other suitable material, and can function as the outer portion of the folio tablet cover 100. Outer folio 400 can include a "south side" 460 or lower region and a "north side" 470 or upper region. Polycarbonate (PC) films 450 can be glued in any suitable configuration on the north side 470 of outer folio 400. Other types of films or sheets may be used (e.g., ABS sheets) as would be appreciated by one of ordinary skill in the art. In some embodiments, either glass fiber panels 350 or Polycarbonate (PC) films 450 may be attached to the top case 300. In other embodiments, any suitable material may be coupled to the top case 300. Furthermore, PC films 450 can be coupled to outer folio 400 by any suitable adhesive (e.g., hot glue, tape, etc.), fastener (e.g., screw, staple, pin, etc.), as required. In some aspects, outer folio 400 can include a fabric 405 coupled to the outside (bottom side of outer folio 400 from the perspective of FIG. 4) such that it covers the entire outside surface area of outer folio 400. In some embodiments, fabric 405 is wrapped or folded around the edge of outer folio 400 and glued in place on the inside edge of outer folio 400. Any suitable adhesive or fastening means can be used to couple fabric 405 to outer folio 400.

FIG. 5 illustrates the process of coupling outer folio 400 to fabric layer 200, according to an embodiment of the invention. The north side 270 of fabric layer 200 (the side opposite of key caps 250) can be coupled to the north side 470 of outer folio 400. In some embodiments, outer folio 400 is glued to fabric layer 200. However, any suitable method (e.g., adhesives, hardware, etc.) may be used as would be appreciated by one of ordinary skill in the art.

FIG. 6 illustrates the process of coupling a mid-case 600 between the fabric layer 200 and outer folio 400, according to an embodiment of the invention. Mid-case 600 is coupled to the inner folio (fabric layer 200) portion at the south side 260. The opposite side of mid-case 600 is coupled to the outer folio 400. Mid-case 600 can be coupled to the inner folio (fabric layer 200) with a double sided adhesive, (heat) glue, screws, pins, mechanical means, pressure, or the like. Mid-case 600 can be coupled to the outer folio 400 by heat glue, adhesive, hardware, or the like. A holder 650 that is configured to hold or retain a tablet computer 105 is coupled to the inner folio 200 on the south side 270, as shown in FIG. 6.

FIG. 7 illustrates the process of populating the mid-case 600 with various components, according to an embodiments of the invention. The mid-case 600 may also be referred to as an intermediate layer 600. Mid-case 600 can include a variety of components to perform the functions of folio tablet cover 100. For example, some of the components can include magnets 610 and 615. Magnet 610 can be used to help keep folio tablet cover 100 in a closed position. In some cases, magnet 610 is placed as such to be magnetically attracted to a magnet embedded in the tablet computer, such that an amount of force may be required to open the folio tablet cover 100. This can prevent the folio tablet cover 100 from accidentally opening. In other embodiments, magnet 610 may be placed in other locations on mid-case 600 or other portions (e.g., outer folio 600, etc.) as required. Also, magnet 610 can also be configured to be attracted to other features (e.g., frame, chassis, etc.) of the tablet computer 105. In some embodiments, a support base may be fixedly attached to the mid-case 600. In such embodiments, a plurality of input structures or input keys may be disposed on the support base and configured to send instructions to the main printed circuit board (PCB) 640 for communicating with a computing device.

Magnet 615 can be configured to help hold the tablet computer 105 in an upright and active configuration when the folio tablet cover 100 and the tablet computer 105 are configured as shown in FIG. 1. Magnet 615 can be configured to prevent tablet computer 105 from tipping over, sliding forward, backward, or laterally, or collapsing by providing a magnetic force to hold the edge of tablet computer 105 (configured within holder 650) in an upright position. Additional magnets can be used and placed in any suitable location to perform the function of holding the tablet computer 105 in an upright and active configuration, as would be appreciated by one of ordinary skill in the art.

Switch 620 can be used to detect when the tablet computer 105 is configured in the upright and active configuration, as shown in FIG. 1. Switch 620 may be a magnetic reed switch, pressure sensor, touch sensor, resistive sensor, or any other type of sensor that can detect when tablet computer 105 is configured in the upright and active configuration. Some embodiments may include additional switches 620 to determine if tablet computer 105 is configured in other configurations. For example, the edge of tablet computer 105 may be configured below the keycaps 250 (obscuring the key caps 250 from a front view perspective), in a middle portion of the group of keycaps 250, directly above the key caps 250, or any other suitable configuration.

In some embodiments, a battery 630, the main printed circuit board (PCB) 640, and universal serial bus (USB) PCB 645 can also be disposed in/on mid-case 600. Although the embodiment shown in FIG. 7 depicts all of the components described above disposed on mid-case 600, it is to be understood that any of the various components (including others not mentioned) can be disposed in or on any suitable location and are not limited to placement on mid-case 600 or to the configuration described with respect to FIG. 7. In some embodiments the battery 630 may be another type of power source 630, as would be appreciated by one of ordinary skill in the art.

Once the mid-case components are assembled, the final portions of folio tablet cover 100 are coupled together and the folio tablet cover 100 is fully assembled. In some cases, the final portions include sealing mid-case 600 between inner layer (e.g., fabric layer) 200 and outer layer 400. It should be understood that this is only one method of manufacturing and more or less steps can be performed to achieve the same result. It should be understood that additional layers, components, and features can embedded within folio tablet cover 100, as would be appreciated by one of ordinary skill in the art with the benefit of this disclosure.

Figure 8:
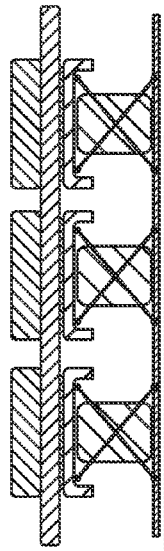
FIG. 8 illustrates manufacturing parameters for the folio tablet cover, according to embodiments of the invention.
Figure 8:

FIG. 8 illustrates manufacturing parameters for the folio tablet cover 100, according to embodiments of the invention. It should be understood that the parameters disclosed in FIG. 8 are for certain permutations of folio tablet cover 100 and that other ranges, values, materials, processes, key types, fabrics, plastics, performance characteristics, etc., can exist in other embodiments.

Keys, Keycaps, and Key Frames

In some embodiments, a flexible fabric keyboard can include a set of molded keycaps and a flexible fabric layer. The flexible fabric layer can serve as a key frame and can be easily bonded to key caps comprised of PU without using high heat or glue in some embodiments. In some embodiments, a set of molded key caps can be formed by infusing PU clay into a molding tool. The set of molded key caps can be bonded against the flexible fabric by applying pressure and by pressing the flexible fabric against the set of molded key caps. Some embodiments may facilitate the bonding by applying hot-press techniques where heat can be applied to the flexible fabric when the key caps are being pressed against the flexible fabric. The molded key caps can be shaped in a manner such that it appears to be protruding from the key frame (or the flexible fabric). The molding tool can cause the key caps to be molded in different shapes. Depending on the type of key frame module to place beneath and couple to the flexible fabric keyboard, the key caps can be molded of a different height, width, or shape.

Figure 9:
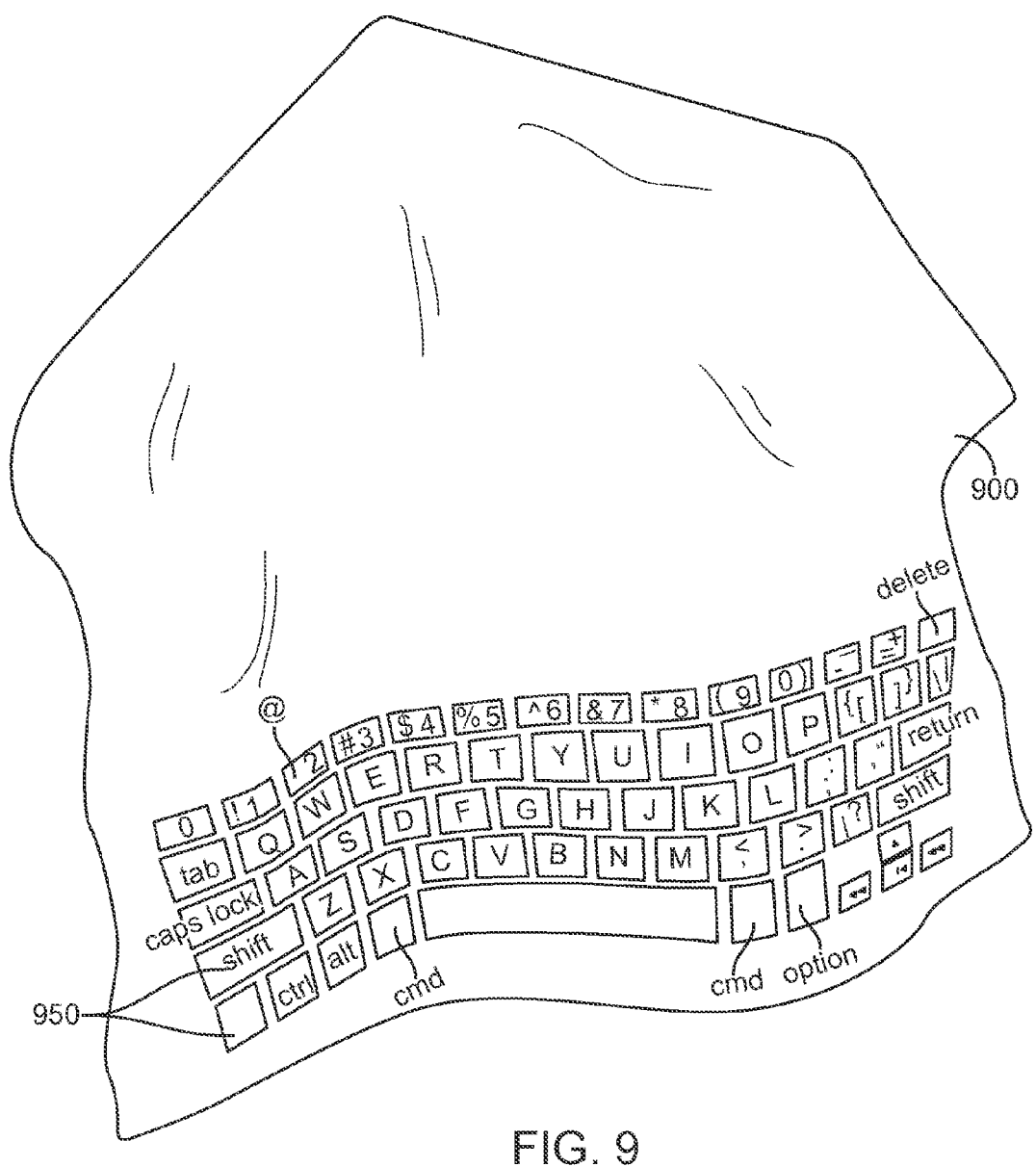
FIG. 9 illustrates a fabric layer (prior to cutting/forming to size) with a number of key caps disposed thereon, according to an embodiment of the invention.

FIG. 9 illustrates a fabric layer 900 (prior to cutting/forming to size) with a number of key caps 950 disposed thereon, according to an embodiment of the invention. In some embodiments, the fabric layer 900 can be made of flexible polyester PU. The fabric layer 900 can be made of other flexible material that includes elongation properties beyond a threshold value in some embodiments. In some embodiments, the molded key caps can be of a different material compared to the fabric layer. For instance, the molded key caps can be comprised of PU or a mixture of PU with one or more laser additives of varying concentrations. The flexible fabric can be comprised of polyester, PU mixture, or other flexible material that can be easily bonded with PU key caps without requiring the application of high temperature to the materials.

As described, the fabric layer 900 (also referred to as inner fabric) can be a key frame that surrounds the various key caps disposed thereon. In some embodiments, key caps 950 are attached (coupled) to the fabric layer 900 by the application of a combination of heat and pressure. In some cases, the key caps 950 can be completely sealed to the fabric layer 900 such that air, dirt, debris, etc., cannot enter underneath the key caps 950 (e.g., via the edges). As described above, the key caps 950 can be composed of molded PU. Alternatively, the key caps 950 can be transfer print silicon, transfer print PU, silicon rubber or any suitable rubber or plastic compound, such as, but not limited to, ABS plastic, neoprene, nylon, or any suitable material. Molded PU material can be flexible and soft to a user's touch while being sufficiently hard that makes it appropriate to combine with the fabric layer 900 in accordance with some embodiments.

In some embodiments, the flexible fabric keyboard as shown in FIG. 9 can be constructed by first infusing liquid PU or liquid silicon (or other suitable material) into a mold. The mold can provide a shape for the key caps such that the desired form of the key caps can be formed by using the mold. After the liquid PU or liquid silicon has partially cured or solidified, fabric layer 900 can be placed over the mold. In some embodiments, the fabric layer 900 can be laid flat over the mold and the liquid silicon or PU will stick on the fabric layer 900. Pressure can be applied (e.g., via a planar plate pushing the fabric layer 900 against the mold) to facilitate the coupling of the key caps 950 and the fabric layer 900 in some embodiments. Some embodiments may not require heat or glue in order for the cured silicon or PU to stick onto the fabric layer 900.

Figure 10:
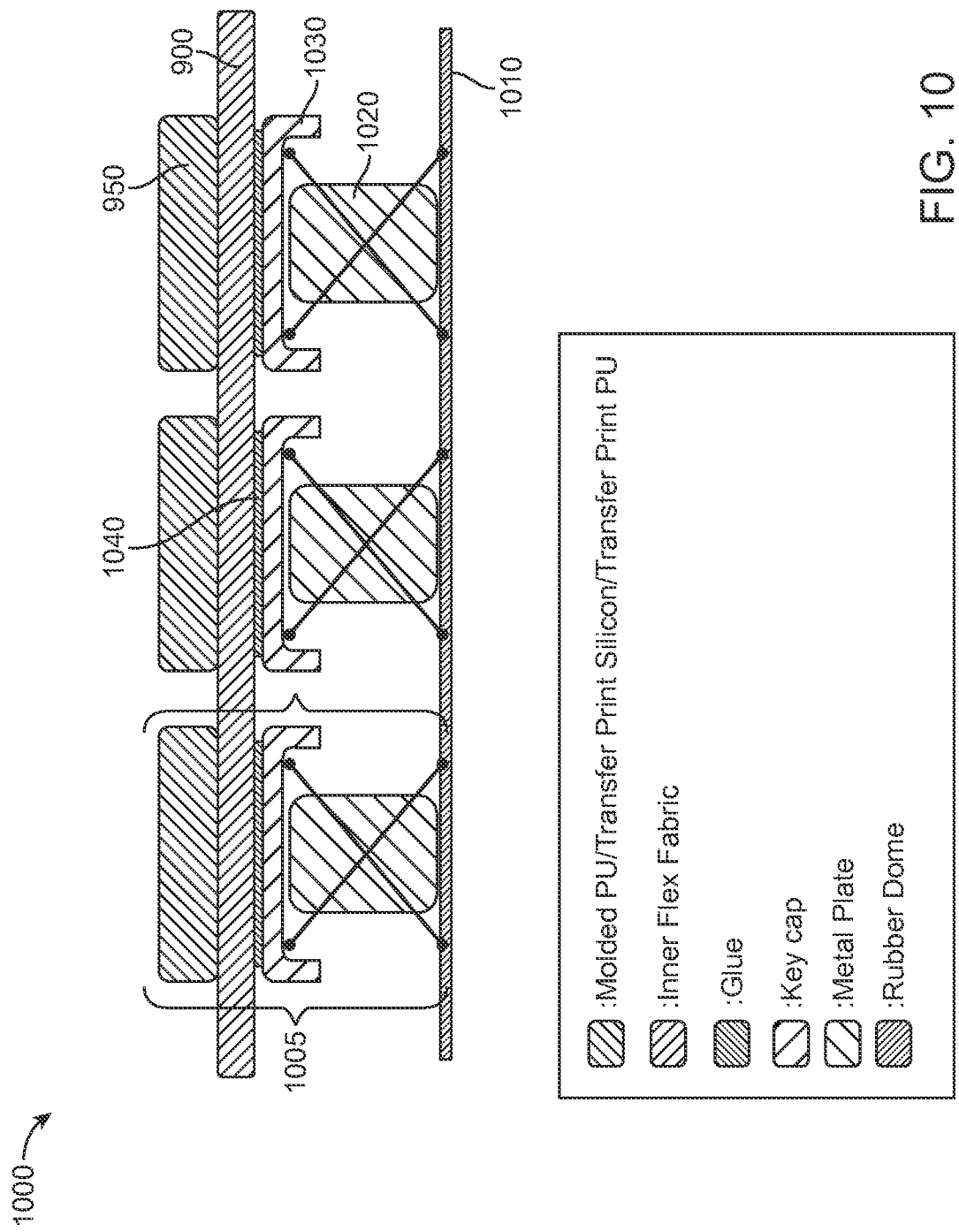
FIG. 10 illustrates a cross-sectional view of a number of individual keys disposed on a fabric key frame (fabric layer), according to an embodiment of the invention.

FIG. 10 illustrates a cross-sectional view 1000 of a number of individual keys 1005 disposed on a fabric key frame (fabric layer) 900, according to an embodiment of the invention. Each individual key 1005 includes a key cap 950 coupled to a top side of soft keyframe (inner fabric) 900, an inner key cap 1030 coupled to the underside of key frame 900. In some embodiments, inner key cap 1030 is coupled to a key structure 1020 (e.g., rubber dome, metal dome, scissor structure, plunger structure) (also referred to as a key frame module or a key frame structure), which sits above a metal plate 1010.

Key cap 950 can be a molded PU layer, transfer print silicon, transfer print PU, rubber, silicon, or the like. Key cap 950 can be similar to key cap 950 of FIG. 9. In some aspects, each key cap 950 can be disposed on key frame (inner fabric) 900. Furthermore, fabric 900 can have flexible properties. The soft fabric key frame 900 can provide a more comfortable typing experience and a softer cosmetic and aesthetic feel for the user. In an alternative embodiment, a compound providing a tactile surface can be disposed on the fabric in lieu of the key caps 950.

In some embodiments, a second key cap (inner key cap 1030) is coupled to the underside of key frame 900. Inner key cap 1030 can be coupled to the underside of key frame 900 by any suitable adhesive, hardware, pressure/heat, or the like. In an exemplary embodiment, inner key cap 1030 is coupled to the underside of key frame 900 by a glue dot 1040. Glue 1040 can be deposited as a small dot (e.g., 4~5 mm in diameter) in the center of the top of the inner key cap 1030. Using only a small glue dot in the middle of inner key cap 1030 provides for a better typing feeling, better elongation, and uniform stretching of key frame 900 between keys 1000. By depositing a small glue dot at the center of the inner key cap 1030 lessens the stress at the edges of the fabric layer 900 beneath the key caps 950 when the key 1005 is depressed or actuated. It should be noted that glue 1040 surface area in FIG. 10 is not to scale and, in exemplary embodiments, would cover a much smaller surface area with respect to the key cap (e.g., less than 20% of the surface area of inner key cap 1030 or approximately 4~5 mm in diameter).

In certain embodiments, inner key cap 1030 may be coupled to a rubber dome structure 1020 to provide a restoring force when the key 1005 is depressed. Any suitable structure can perform the restoring force including a scissor structure, metal dome structure, plunger structure, etc. In some cases, the rubber dome structure 1020 can be configured to sit above a metal plate 1010. In certain embodiments, the keycaps 950 and key frame 900 may provide a waterproof, water resistant, and/or submergible barrier that can protect the components disposed under key frame 900 (e.g., inner key cap 1030, metal plate 1010, electronic components (as shown in FIG. 7), or the like.

FIGS. 11A-J illustrate a number of individual keys with PU key caps, a fabric key frame, keycaps disposed underneath (or alternatively within) the key frame, and scissor key structures, according to some embodiments. FIG. 11A illustrates a number of individual keys with a PU key cap 950, a fabric key frame 900, a second keycap 1030 disposed underneath (or alternatively within) the key frame 900, and scissor keys 1020, according to an embodiment of the invention. FIG. 11B illustrates a number of individual keys with a fabric key frame 900, a key cap 1030 disposed underneath (or alternatively within) the key frame 900, and scissor keys 1020, according to an embodiment of the invention. FIG. 11C illustrates a number of individual keys with first key cap 950 disposed above a second keycap 1030, the combination of the two disposed beneath (or within) a fabric key frame 900, and scissor keys 1020, according to certain embodiments of the invention. In the implementation shown, the first key cap protrudes upward such that they can be seen extending from the fabric key frame 900. FIG. 11D depicts a similar embodiment with only one keycap 1030 disposed beneath the fabric key frame 900, according to an embodiment of the invention. FIG. 11E illustrates a number of individual keys with first key cap 950 disposed above a second keycap 1030, the combination of the two disposed beneath (or within) a fabric key frame 900, and scissor keys 1020, according to certain embodiments of the invention. In the implementation shown, the first key cap 950 is flush against the bottom side of the fabric key frame 900. FIGS. 11F-11J show key constructions similar to those shown in FIGS. 11A-11E, with the implementation of a plunger-style key in lieu of the scissor keys shown therein.

Key Support—Scissor and Dome Structures

Figure 12A:
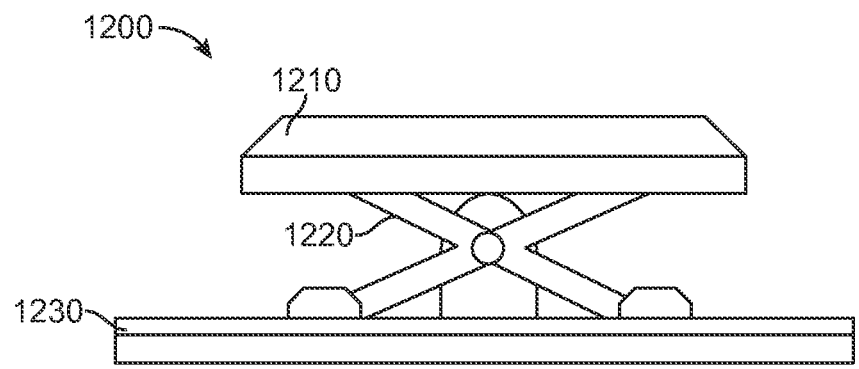
FIGS. 12A-12B illustrate a key supported by a scissor key structure, according to an embodiment of the invention.

FIG. 12A illustrates a key 1200 supported by a scissor key structure, according to an embodiment of the invention. Key 1200 includes a key top 1210, a scissor structure 1220, and a support base 1230. In some embodiments, the key top 1210 can be made of PU material or other suitable material as discussed above with respect to FIGS. 2 and 9. The support base 1230 can be metal, plastic, rubber, or other suitable material to provide support for key 1200. In an exemplary embodiment, the key cap 1210 is 1.5 mm thick, the scissor key (not pressed) is 1.4 mm thick, and the support base is 0.9 mm thick. The travel distance of the key from an unpressed state to a fully pressed state can be 1.2 mm. The pitch of the key 1200 can be 16~19 mm, depending on the design and application. The module thickness (i.e., distance from the support base 1230 to the top of the key top 1210) can be 3.8 mm. The click ratio can be 19 mm and the thickness can be 40-45%. It should be noted that the dimensions provided are merely exemplary embodiments and other dimensions, sizes, characteristics (e.g., travel distance, pitch, etc.) can be used.

Figure 12B:
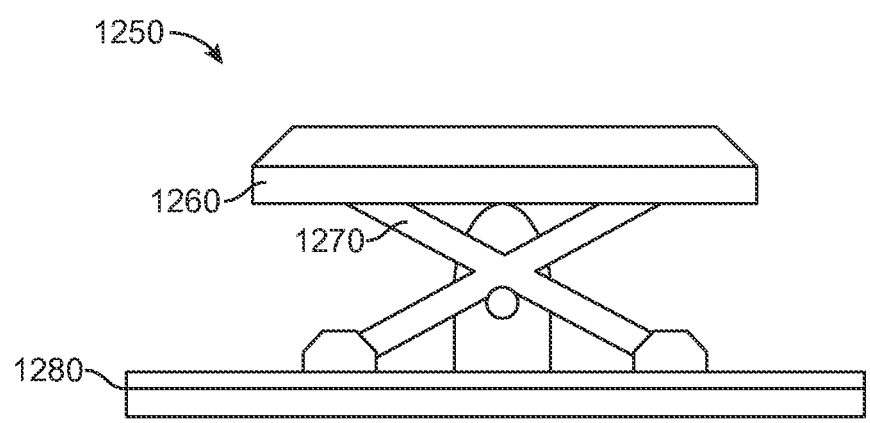

FIG. 12B illustrates a key 1250 supported by a scissor key structure, according to an embodiment of the invention. Key 1250 includes a key top 1260, a scissor structure 1270, and a support base 1280. In some embodiments, the key top 1260 can be made of PU material or other suitable material as discussed above with respect to FIGS. 2 and 9. The support base 1280 can be metal, plastic, rubber, or other suitable material to provide support for key 1250. In an exemplary embodiment, the key cap 1260 is 1.5 mm thick, the scissor key (not pressed) is 2.2 mm thick, and the support base is 0.9 mm thick. The travel distance of the key from an unpressed state to a fully pressed state can be 1.5 mm. The pitch of the key 1250 can be 16-19 mm, depending on the design and application. The module thickness (i.e., distance from the support base 1280 to the top of the key top 1260) can be 4.6 mm. The click ratio can be 17 mm and the thickness can be 40-45%. It should be noted that the dimensions provided are merely exemplary embodiments and other dimensions, sizes, characteristics (e.g., travel distance, pitch, etc.) can be used.

Keycap with Metal Dome Structure

Figure 13:
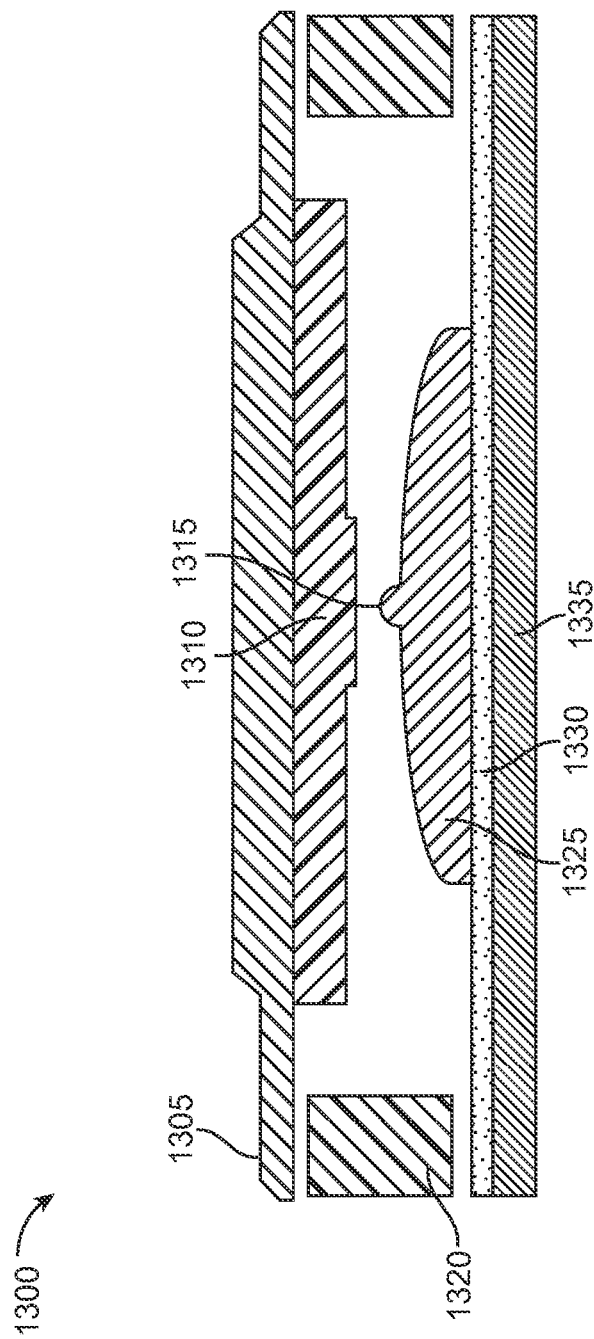
FIG. 13 illustrates a key supported by a rubber keyframe structure, according to some embodiments of the invention.

Some embodiments can provide a rubber keyframe with a metal dome array. In some embodiments, a rubber skin (e.g., silicon rubber skin) can be placed over a key cap (e.g., a plastic key cap) to provide improved tactile feedback while ensuring soft touch against the user's fingers. FIG. 13 illustrates a key 1300 supported by a rubber keyframe structure, according to some embodiments of the invention. Key 1300 includes a silicon rubber skin 1305, a plastic key cap 1310, an actuator 1315, a plastic frame 1320, a metal dome 1325, a membrane 1330, and a metal support plate 1335. In some embodiments, the silicon rubber skin 1305 can be made of PU material or other suitable material (e.g., with flexible properties). Some embodiments may mold an additional PU key cap (not shown) over the silicon rubber skin 1305 to improve tactile feedback and to provide a softer touch. In this embodiment, the portion of the rubber skin that can be placed over a key cap can 1310 can be made thicker to appear distinguishable from the surrounding rubber frame, albeit being made from the same material.

While the plastic key cap 1310 and the frame 1320 are shown to be made of plastic in this example, other types of material can be used in different embodiments. While the dome 1325 and support plate 1335 are made of metal in this example, different embodiments can use plastic, rubber, or other suitable material to provide support for key 1300. In an exemplary embodiment, the silicon rubber skin 1305 is 0.6 mm, the plastic key cap 1310 is 0.9 mm thick, the metal dome 1325 is 0.7 mm, the membrane 1330 is 0.2 mm, and the metal support plate 1335 is 0.6 mm.

Figure 26:
FIG. 26 illustrates specifications of an exemplary embodiment.
Figure 26:

The travel distance of the key from an unpressed state to a fully pressed state can be 0.3~0.4 mm. The pitch of the key 1300 can be 16~19 mm, depending on the design and application. The module thickness (i.e., distance from the metal support base 1335 to the top of the plastic key cap 1310) can be 2.0~3.0 mm. The module thickness including the rubber skin 1305 (and possibly an additional PU key cap) can be 2.5~3.5 mm. It should be noted that the dimensions provided are merely exemplary embodiments and other dimensions, sizes, characteristics (e.g., travel distance, pitch, etc.) can be used. Specifications of an exemplary embodiment can be shown in FIG. 26.

As described, the rubber skin 1305 can be made of silicone or a blend with PU material. The silicon rubber skin 1305 can provide a key surface that is soft to the user's touch. The flexibility and softness features of the material can provide protection to the screen of the tablet computer when the cover is folded over the tablet computer. Further, in addition to its lightness in weight, the material can permit water and soil resistance.

Figure 14:
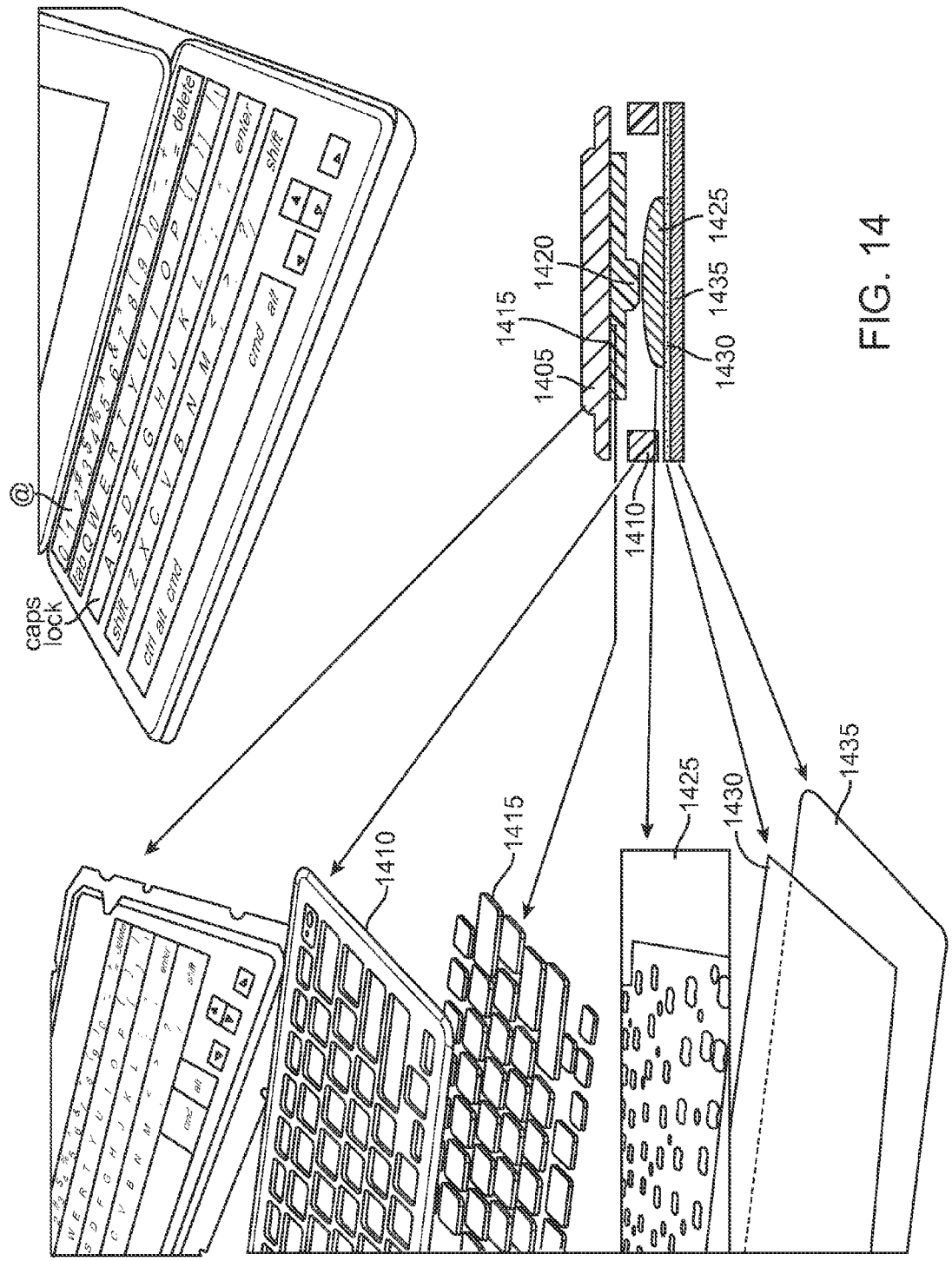
FIG. 14 illustrates a process of assembling the components in a rubber keyframe with a metal dome array.

FIG. 14 illustrates a process 1400 of assembling the components in a rubber keyframe with a metal dome array. In some embodiments, the rubber skin 1405 can be attached to the plastic frame 1410 to form a bonded assembly. The bonded assembly can be formed by attaching the rubber skin 1405 to the plastic frame 1410 using glue posited with ultraviolet (UV) light, such as UV glue. In certain embodiments, the bonded assembly can formed by molding the rubber skin 1405 to the plastic frame 1410 using a hot-press mold. The bonded assembly can be applied over the dome array type module (also referred to as the dome-type keyframe module).

In some embodiments, the bonded assembly can be formed by molding an additional key cap (e.g., a PU key cap) directly over the rubber skin 1405. In certain embodiments, instead of an additional key cap, the portions of the rubber skin 1405 that are above a key structure can be thickened to indicate that those are the areas for actuation. In other embodiments, additional material may be placed between the silicon rubber skin 1405 and the key cap 1410 such that the skin 1405 may appear smooth and uniform against the key cap 1410.

In some embodiments, the rubber skin 1405 can be coupled to the key frame 1410 by placing glue over portions of the plastic frame 1410. The glue can be applied on top of the plastic frame 1410 by applying a roller over a grid pattern of the plastic frame 1410. In certain embodiments, additional glue may be posited in an area between the rubber key caps (or the rubber skin 1405) and the plastic key caps 1415. For instance, additional glue can be posited at the center of the plastic key caps 1415 to facilitate partial bonding of the rubber skin 1405 against the plastic key caps 1415. As such, the stress at the edges of the rubber skin 1405 right above the plastic key caps 1415 is minimized and elongation is increased.

In some embodiments, the plastic key caps 1415, the metal domes 1425, the membrane 1430, the metal support plate 1435 can be coupled using various adhesive techniques, including glue or pressure and heat, to form a metal dome keyframe module (also referred to as a metal dome array). The bonded structure of the silicon rubber skin 1405 and the plastic frame 1410 may then be positioned and applied against the metal dome array (also referred to as the keyframe module) e.g., using force and heat or via glue on the plastic frame 1410 to form the flexible keyboard. In one embodiment, the rubber keyframe structure can be assembled by coupling the rubber skin 1405, the plastic frame 1410, the plastic key cap 1415, the actuator layer 1420, the metal dome layer 1425, the membrane 1430, and the metal support plate 1435, in this order.

In certain embodiments, the plastic frame 1410 forms a closed boundary (e.g., a rectangle, an oval) around each key and can be bounded against the bonded assembly that includes the silicon rubber skin and the plastic key cap. When the key 1400 is actuated (i.e., pressed down, depressed), the edges of the silicon rubber skin 1405 above the plastic key cap 1415 can be stretched. As such, elasticity in these portions are important. As gluing the bonded assembly against the key frame may impact the force, a snap-in model may be utilized in some embodiments.

In some embodiments, a metal dome can be used in traditional keys where the plastic keycap is visible on the top and the key does not have a layer of rubber skin that can serve as protection or that can be soft to a user's touch. In certain embodiments, the top surface of the key cap can be higher than the surrounding frame. This ensures that the user can position the fingers easily and improve the typing speed by being able to quickly identify the keys. Providing the key caps at a plane higher than the surrounding frame produces tension on the keys. By having tensions on the keys, the keys may be more stabilized and not move sideways or feel loose when it is in an unactuated position.

Some embodiments may maximize the elongation area of the hinges (the flexible area between the frame and the key cap) for each key using a number of ways. In some embodiments, the elongation area can be increased by applying glue within a restricted area (e.g., the center) of the plastic key cap. For example, by applying a small dot of glue on the bottom and in the center of the bonded assembly of the rubber skin and the plastic key cap may maximize the elongation across most of the surface area in some embodiments. As described, some embodiments may use a snap-in feature (e.g., using magnetic force) instead of gluing the bonded assembly against the metal dome.

Keycap with Metal Dome Plus Hinge and Axis

Figure 15:
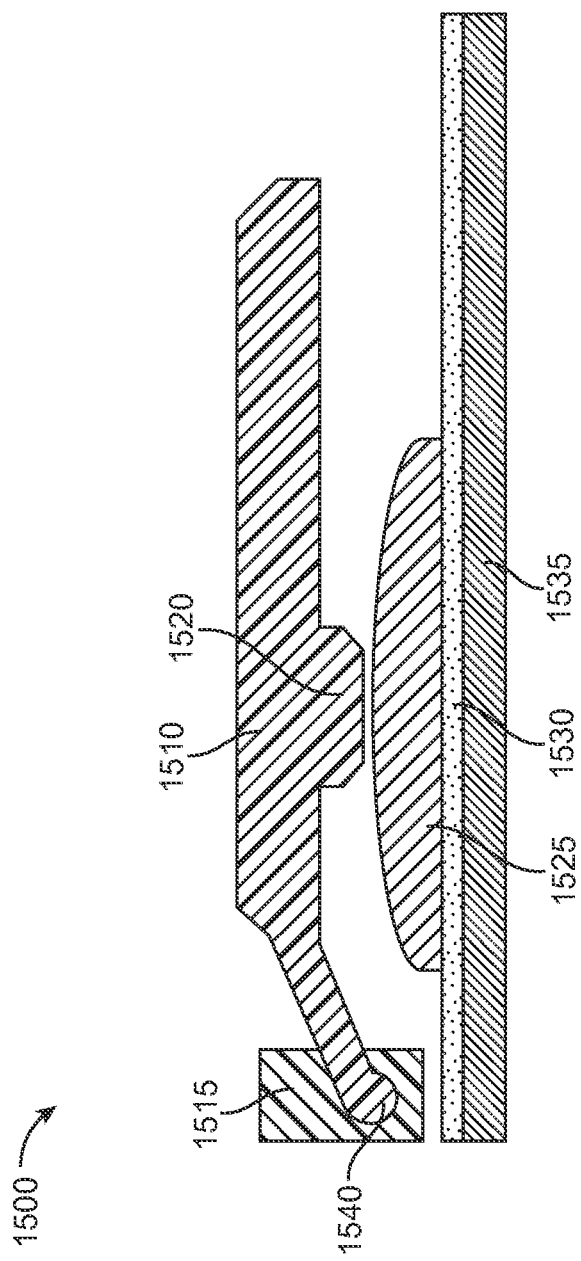
FIG. 15 illustrates a key supported by a rubber keyframe structure, according to some embodiments of the invention.

Some embodiments can provide an ultra-slim keyframe with a metal dome. By adding a hinge on the top key cap, traveling can be ensured to be in one direction (or close to one direction). This can improve the typing feel and the typing speed. FIG. 15 illustrates a key 1500 supported by a rubber keyframe structure, according to some embodiments of the invention. Key 1500 includes a plastic key cap 1510, a plastic frame 1515, an actuator 1520, a metal dome 1525, a membrane 1530, a metal support plate 1535, and a hinge 1540.

In some embodiments, a flexible skin layer (not shown) can be molded over the key 1500. The flexible skin layer can be a silicon rubber skin or a flexible fabric layer made of polyester. The silicon rubber skin can be made of silicone, PU, or other suitable material (e.g., with flexible properties). In some embodiments, instead of a silicon rubber skin, a flexible fabric layer made of polyester, PU, or a PU mixture can be molded over key 1500. Further, some embodiments may mold an additional PU key cap (not shown) over the flexible skin layer to provide further improved tactile feedback and a softer touch. While rubber skin is usable over a key structures including the scissors key structure, some embodiments may opt for a fabric skin layer over the various key structures (e.g., the scissors key structure, the dome key structure) as the fabric skin layer may be lighter compared to the rubber skin, thereby lessening the force impact and ensuring better tactile feedback.

While the plastic key cap 1510 and the frame 1515 are shown to be made of plastic in this example, other types of material can be used in different embodiments. While the dome 1525 and support plate 1535 are made of metal in this example, different embodiments can use plastic, rubber, or other suitable material to provide support for key 1500. In an exemplary embodiment, the plastic key cap 1510 is 1.4 mm thick, the actuator 1520 is 0.3 mm thick, the metal dome 1525 is 0.7 mm, the membrane 1530 is 0.3 mm, and the metal support plate 1535 is 0.6 mm. The thickness of the various components may vary from embodiment to embodiment.

The travel distance of the key 1500 from an unpressed state to a fully pressed state can be 0.5~0.8 mm. The pitch of the key 1500 can be 16-19 mm, depending on the design and application. The module thickness (i.e., distance from the metal support base 1535 to the top of the plastic key cap 1510) can be 2.5~3.5 mm. It should be noted that the dimensions provided are merely exemplary embodiments and other dimensions, sizes, characteristics (e.g., travel distance, pitch, etc.) can be used. Specifications of an exemplary embodiment can be shown in FIG. 26.

Some embodiments provide a key 1500 with a hinge 1540 coupled to the top key cap 1510 to provide a more consistent and nearly uni-directional movement of the of the key when it is actuated. This type of structure keeps the key from traveling in different directions when a user presses down on the key, regardless of the direction from which force is being applied. The typing feeling can be consistent and the typing speed can be increased. In one embodiment, the key travel distance for the rubber keyframe can be 0.6-0.8 mm.

In some embodiments, the location of the metal dome 1525 (and the actuator on top of the metal dome) can be closer or farther from the hinge structure 1540. Depending on the placement of the metal dome 1525, the key travel distance can be increased when the force is applied from the center or from the edge that is opposite from the hinge 1540. For example, when the placement of the metal dome 1525 and actuator 1520 are closer to the hinge 1540, the structure can have a longer traveling distance. The bottom edge of the key cap (sitting opposite from the hinge) may travel farther and bottom out at membrane, whereas the top edge of the key cap 1510 may travel very little.

Some embodiments provide a metal dome with low force (e.g., 60~80 grams force) that provides consistency and less force impact typing when used in a keyboard. By using a plastic hinge to facilitate the depression of the low force metal dome, the traveling of the key is more stable and less wobbly regardless of the angle at which the key is being depressed. Further, by placing the dome structure (e.g., metal dome, rubber dome) off-center or farther away from the hinge, the swing of the key cap is lessened and a shorter travel is achieved. In some embodiments, a shorter travel can be achieved by using a rubber dome instead of a metal dome.

In some embodiments, the top surface of the key cap 1510 can be higher than the surrounding frame 1515 and the hinge axis 1540. Some embodiments place the key cap 1510 at a threshold distance above the plane of the hinge 1540. The key 1500 may not physically travel a great distance, however, this structure provides the user the sensation that the user is getting a full key stroke (or using a normal keyboard) when the key 1500 is depressed.

The hinge 1540 produces a swinging-type movement and enables stable and consistent travel of the key. In some embodiments, a flexible skin (not shown) such as a rubber skin layer or a fabric skin layer can be placed over the structure. By fastening the key cap with a flexible skin such as a rubber skin layer on top allows the keyframe to have added stability. The key cap may be prevented from flipping up or springing back up beyond its neutral state. In addition, without any portion of the flexible skin floating over the key cap, the skin may appear smooth and uniform against the key cap. The added skin can produce a sleeker look while rendering the hinge less visible. Some embodiments may couple a stopper to the edge of the plastic frame that is opposite of the hinge in order to stop the key cap from flipping beyond its neutral planar (or near planar) state.

Figure 16:
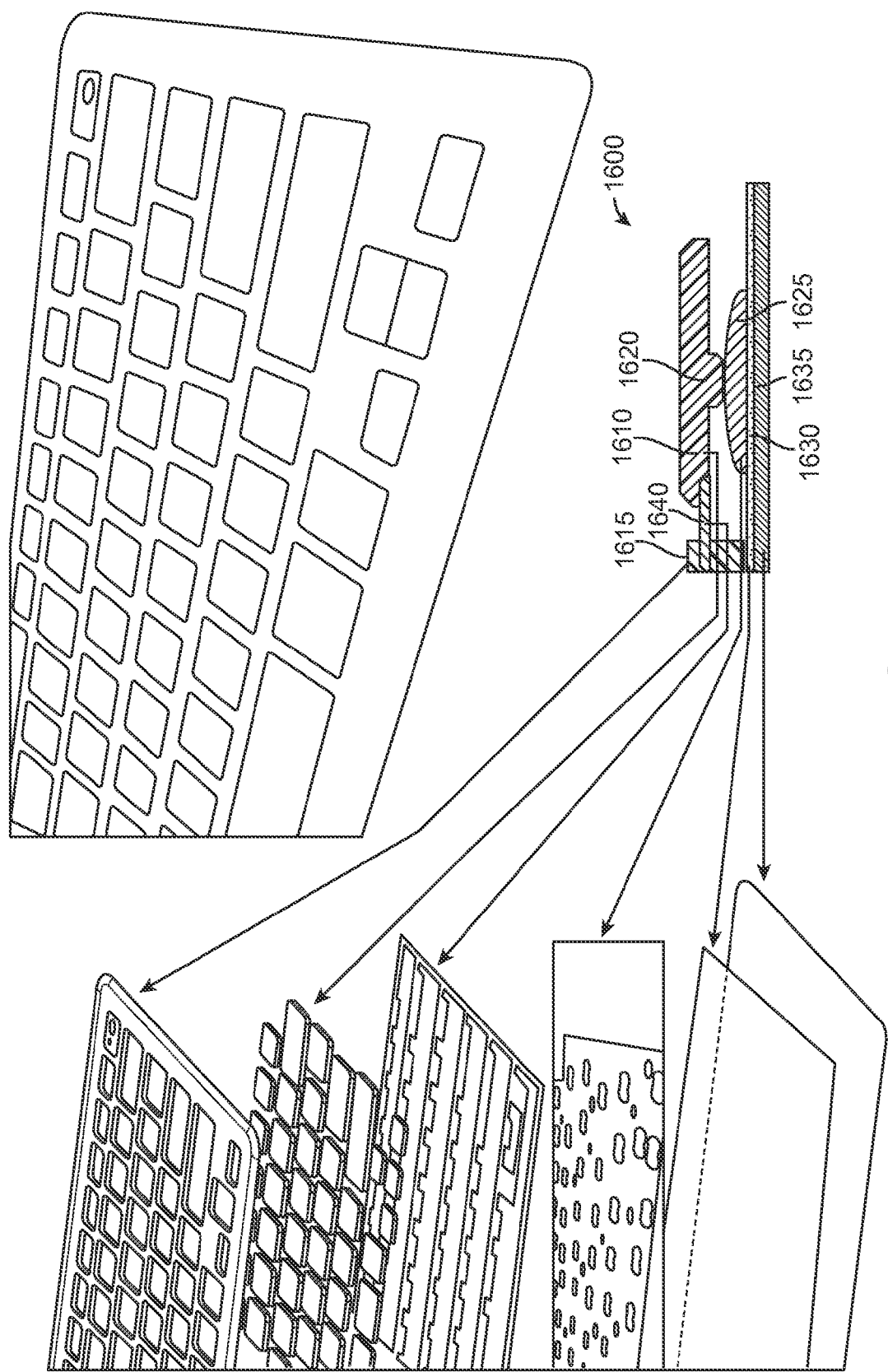
FIG. 16 illustrates a process of assembling the components in a ultra-slim keyframe with a metal dome array.

FIG. 16 illustrates a process 1600 of assembling the components in a ultra-slim keyframe with a metal dome array. In some embodiments, the key cap 1610 can be attached to a flexible skin (not shown) such as a rubber skin layer or a fabric skin layer to form a bonded assembly. In addition to a flexible skin, the key cap 1610 and a flexible skin can have a PU key cap molded over the flexible skin e.g., by using pressure and heat. In one embodiment, the ultra-slim keyframe structure can be assembled by coupling the plastic frame 1615, the plastic key cap 1610, the mylar hinge layer 1640, the actuator layer 1620, the metal dome layer 1625, the membrane 1630, and the metal support plate 1635, in this order.

Figure 17:
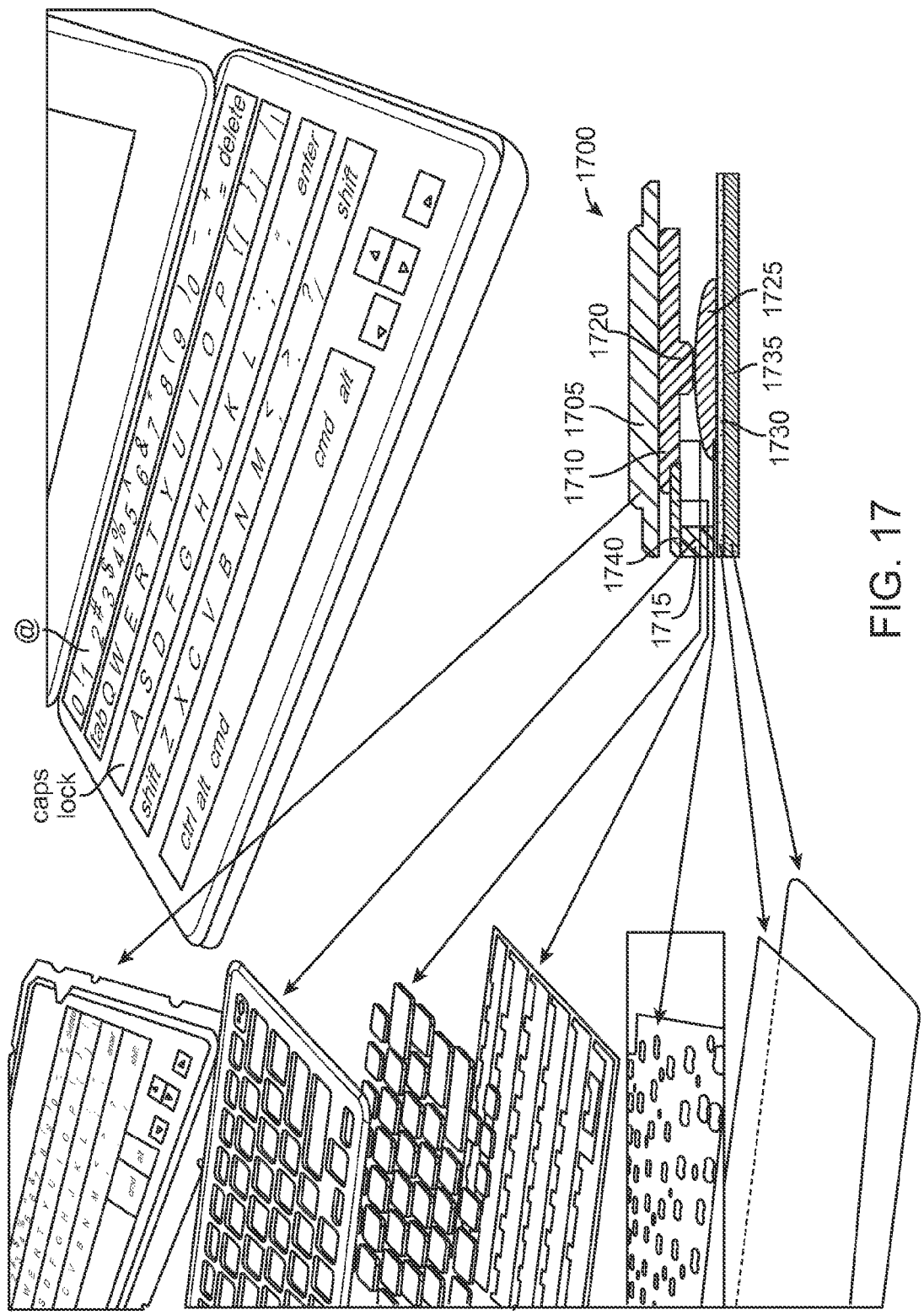
FIG. 17 illustrates a process of assembling the components in a ultra-slim keyframe with a metal dome array and a rubber skin layer on top of the keyframe.

FIG. 17 illustrates a process 1700 of assembling the components in a ultra-slim keyframe with a metal dome array and a rubber skin layer on top of the keyframe. This process is similar to the process 1600. In process 1700, a rubber skin 1705 can be glued to a keyframe 1715 and/or partially to a key cap 1720 to form a bonded assembly. In one embodiment, the bonded assembly can be formed by molding the rubber skin 1705 to the key cap 1710 using glue posited with ultraviolet (UV) light, such as UV glue. In certain embodiments, the bonded assembly can formed by molding the rubber skin 1705 to the key cap 1710 using a hot-press mold. The bonded assembly can be applied over the dome array type module (also referred to as the key frame).

In some embodiments, the bonded assembly is formed in a manner such that the rubber skin 1705 is molded directly over the key cap 1710 and without any portion of the rubber skin 1705 floating over the key cap 1710. As such, the skin 1705 may appear smooth and uniform against the key cap

1710. In other embodiments, additional material may be placed between the silicon rubber skin 1705 and the key cap 1710. In some embodiments, a PU key cap can be molded over the rubber skin 1705 above the plastic key cap 1710, e.g., via pressure and heat, if desired. As describe, some embodiments may use a flexible fabric layer such as flexible polyester or a PU mixture to form the bonded assembly with the key cap instead of silicone rubber. As such, a PU key cap can be easily bonded to the flexible fabric layer without requiring the application of high heat, which may potentially distort the materials.

In some embodiments, the bonded structure (including the rubber skin 1705 and the plastic key cap 1710) is coupled to the remaining keyframe structure by placing glue over the plastic frame 1715. The glue may be applied on top of the plastic frame 1715 by applying a roller over a grid pattern of the plastic frame 1715. In certain embodiments, additional glue may be posited in an area between the key cap and the plastic frame to help improve the impact force, the travel distance of the key, and the critical ratio. The bonded structure of the silicon rubber skin 1705 and the plastic key cap 1710 may then be positioned and applied against the metal dome array (also referred to as the key frame) with force and heat. The plastic key cap 1710 may be floating over the key frame in some embodiments. In one embodiment, the ultra-slim keyframe structure can be assembled by coupling the rubber skin layer 1705, the plastic frame 1715, the plastic key cap layer 1710, the mylar hinge layer 1740, the actuator layer 1720, the metal dome layer 1725, the membrane 1730, and the metal support plate 1735, in this order.

Misc Key Structures

Figure 18:
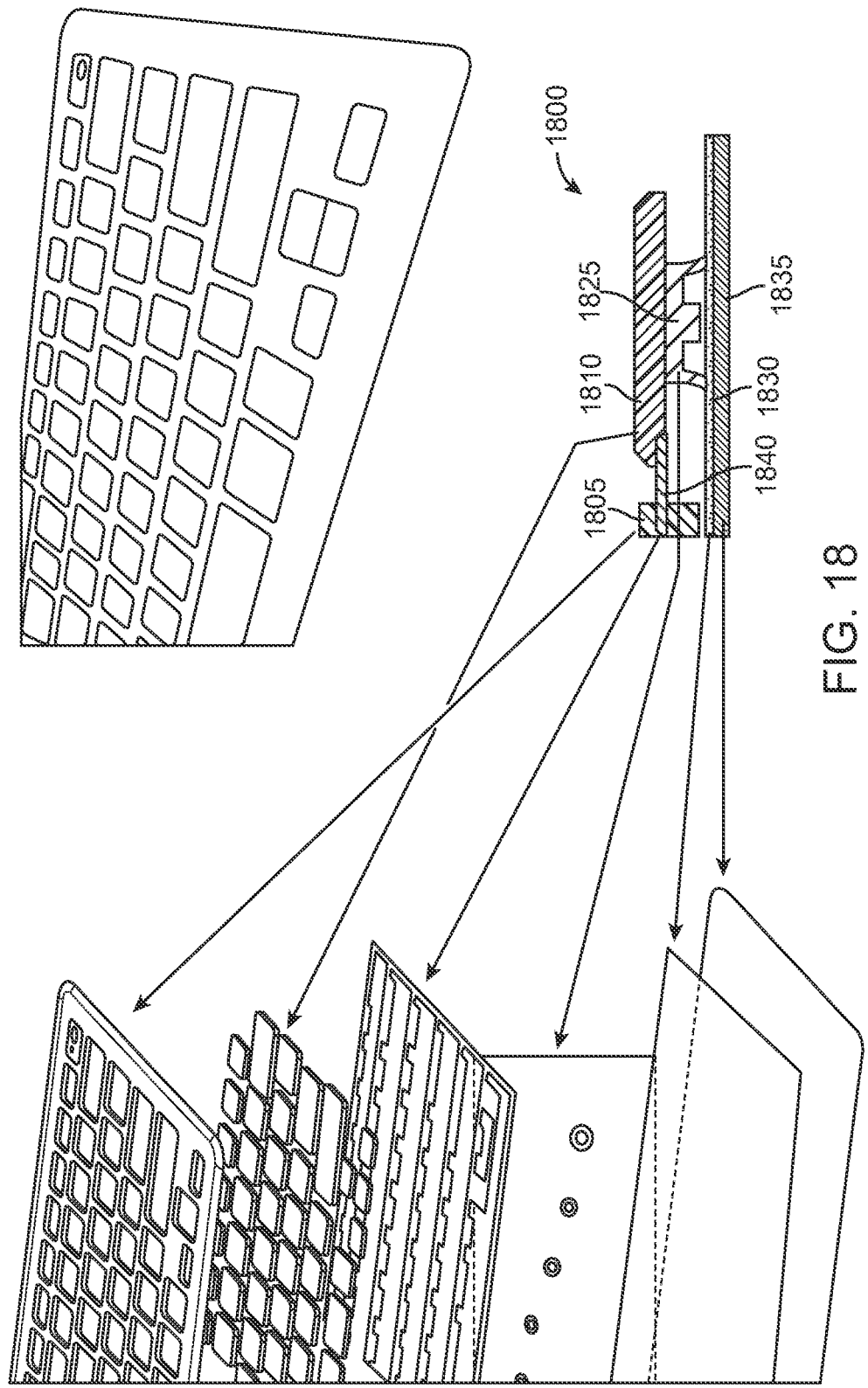
FIG. 18 illustrates an example of an ultra-slim keyframe structure 1800 with a rubber dome in accordance with some embodiments.

Additional key structures can be provided for some embodiments of the invention. FIG. 18 illustrates an example of an ultra-slim keyframe structure 1800 with a rubber dome 1825 in accordance with some embodiments. Rubber domes are conventionally used in cell phone devices. The typing speed and key stability may not be as good as metal domes. The travel distance for the keys is 0.5~0.8 mm. The structure and the construction of the ultra-slim keyframe structure 1800 with the rubber dome is similar to that of the ultra-slim keyframe structures 1600 and 1700 with the metal dome as shown in FIGS. 16 and 17. FIG. 18 includes a special rubber dome 1825 that can replace the metal dome 1725 in FIG. 17.

In an exemplary embodiment, the plastic key cap 1810 is 1.2 mm thick, the rubber dome 1825 is 1.2 mm, the membrane 1830 is 0.3 mm, and the metal support plate 1835 is 0.6 mm. The thickness of the various components may vary from embodiment to embodiment. The module thickness (i.e., distance from the metal support base 1835 to the top of the plastic key cap 1810) can be approximately 3.3 mm.

The assembly process for the ultra-slim keyframe structure 1800 can be similar to that shown in FIG. 16. In some embodiments, the key cap 1810 can be attached to a flexible skin (not shown) such as a rubber skin or a fabric skin to form a bonded assembly. In addition to a flexible skin, the key cap 1810 and the flexible skin can have a PU key cap molded over the flexible skin e.g., using pressure and heat. In one embodiment, the ultra-slim keyframe structure can be assembled by coupling the plastic frame 1805, the plastic key cap 1810, the mylar hinge layer 1840, the metal dome layer 1825, the membrane 1830, and the metal support plate 1835, in this order.

Figure 19:
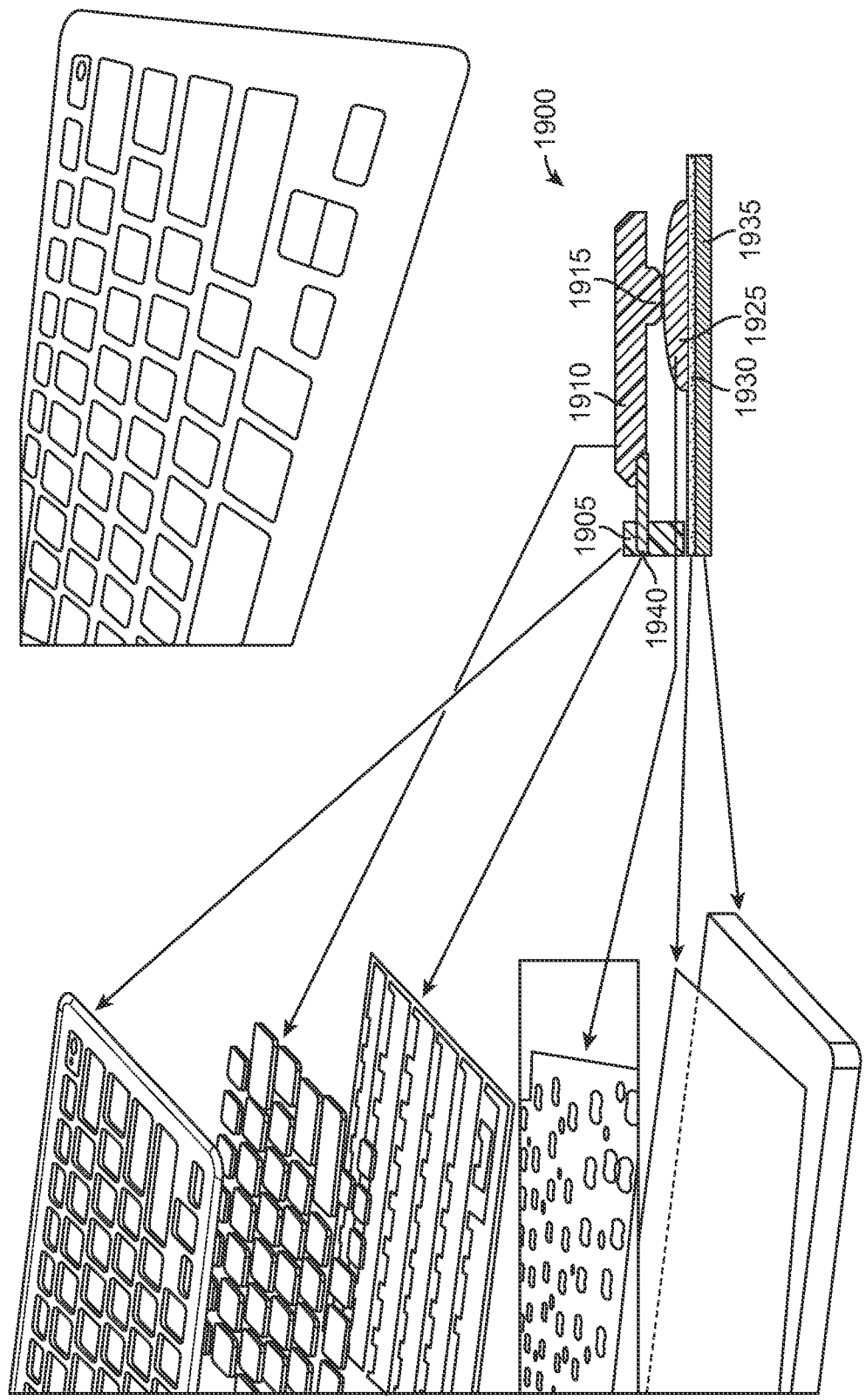
FIG. 19 illustrates an example of another ultra-slim keyframe structure 1900 with a metal dome in accordance with some embodiments.

FIG. 19 illustrates an example of another ultra-slim keyframe structure 1900 with a metal dome in accordance with some embodiments. The structure and the construction of the ultra-slim keyframe structure 1900 with the rubber dome is similar to that of the ultra-slim keyframe structures 1500 and 1600 with the metal dome as shown in FIGS. 15 and 16. FIG. 19 illustrates a key 1900 includes a plastic key cap 1910, an actuator 1915, a plastic frame 1905, a metal dome 1925, a membrane 1930, a metal support plate 1935, and a mylar hinge 1940.

The placement of metal dome 1925 on the membrane in FIG. 19 is farther from the center of the membrane 1930 compared to the placement of the metal dome 1725 in FIG. 17. The actuator 1915 is also positioned towards the outer edge (i.e., the opposite edge from the hinge 1940) of the plastic key cap 1910. As such, the key travel distance may be less compared to key 1500 in FIG. 15, e.g., when the key is actuated at an angle that is not directed from above. The stability can be improved by placing the dome structure farther away from the hinge (rather than directly aligned or closely aligned to the center of the key cap), along with the tactile feedback.

In some embodiments, a flexible skin (not shown) such as a silicon rubber skin or a fabric skin can be molded over the key 1900. The flexible skin can be made of PU material or other suitable material (e.g., with flexible properties). Some embodiments may mold an additional PU key cap (not shown) over the flexible skin to provide further improved tactile feedback and a soft touch.

In one embodiment, the ultra-slim keyframe structure 1900 can be assembled by coupling the plastic frame 1905, the plastic key cap 1910, the mylar hinge layer 1940, the metal dome layer 1925, the membrane 1930, and the metal support plate 1935, in this order. In some embodiments, the key cap 1910 can be attached to a flexible skin (not shown) to form a bonded assembly. In addition to a flexible skin made of either rubber or fabric, the flexible skin can have a PU key cap molded over the flexible skin, e.g., by using pressure and heat, in some embodiments.

Magnets

FIGS. 20A and 20B depict a plurality of magnets embedded in a folio tablet cover 2000, according to an embodiment of the invention. Magnets can be used to secure a tablet computer 105 in a variety of configurations. Folio tablet cover 2000 can include magnets A-F disposed as shown in FIG. 20. In some embodiments, a magnet can be embedded in the key structure (e.g., a space bar) or surrounding case.

Magnets A and F make up a latching system for folio tablet cover 2000, according to an embodiment of the invention. Magnet A can be disposed in a tablet holder 2015 (e.g., similar to holder 650 of FIG. 6) at a "north side" 2010 of the folio tablet cover 2000, as shown in both FIGS. 20A and 20B. Magnet F can be disposed on the "south side" 2020 below the keyboard region 2030, as shown in both FIGS. 20A and 20B. Magnets A and F are configured such that they are magnetically attracted to each other, thereby holding the folio tablet cover 2000 in a closed folio configuration, as shown in FIG. 20B. The size of the magnets may vary in size, general placement, and strength. For example, regarding size each magnet A/F may cover the entire width of the folio cover 2000, as shown. Alternatively, each magnet A/F may be shorter and cover a smaller distance. In some embodiments, there may be multiple magnets A and multiple magnets F. Any suitable arrangement of magnets may be used to perform the function of holding the folio tablet cover 2000 together in a closed folio configuration.

Magnets B and C make up a detaching system for folio tablet cover 2000, according to an embodiment of the invention. Magnets B and C can be disposed on the bottom of the north side 2010, as shown in FIGS. 20A and 20B. Typically, a top side of holder 2015 is secured to the top of north side 2010 and bottom side of holder 2015 is not connected to the tablet cover 2000 such that it can fold out and hold the holder/tablet computer 105 in various modes of operation (e.g., media mode, typing mode—as shown in FIG. 1). To prevent the holder/tablet from swinging open when the folio cover 2000 is opened, for example, Magnets B and C are magnetically attracted to each other and operate to hold the holder/tablet firmly and securely against north side 2010 of folio cover 2000 until a user detaches the holder 2015 from the north side 2010 to place the folio cover 2000 in the various modes of operation. To illustrate this concept, if one were to open a book with the spine facing upwards, the pages inside would swing freely and any contents (e.g., book marks, loose leaf papers, etc.) would fall out. However, if one were to secure the pages to the book cover with a binder clip, then the pages would be held together, no pages would freely swing, and the contents within the pages would not freely fall out of position. Magnets B and C operate to hold the holder 2015 (holding tablet computer 105) against the north side 2010 such that the holder 2015 cannot freely swing down unless the user purposefully separates the two to, for example, place folio cover 2000 in a certain mode of operation. The size of the magnets may vary in size, general placement, and strength. For example, regarding size each magnet B/C may cover a portion of the bottom of north side 2010, as shown in FIG. 20A. Alternatively, each magnet B/C may be shorter or longer and cover different size areas. In some embodiments, there may be multiple magnets B and multiple magnets C, as shown in FIG. 20A. Any suitable arrangement of magnets may be used to perform the function of forming the detaching system of folio tablet cover 2000.

Magnets D and F make up a media mode system (e.g., second active configuration) for folio tablet cover 2000, according to an embodiment of the invention. In the media mode, the tablet computer 105 is positioned such that the edge is resting against the south side 2020 and just below keyboard 2030, such that keyboard 2030 is obscured by the tablet computer 105 when viewed from the front. Magnet D can be disposed in a tablet holder 2015 of the folio tablet cover 2000, as shown in both FIGS. 20A and 20B. Magnet F can be disposed on the "south side" 2020 below the keyboard region 2030. Magnets D and F are configured such that they are close enough to each other to be magnetically attracted when the folio tablet cover 2000 is an active media mode state. Thus, magnets D and F function to hold folio tablet cover 2000 in an active and upright media mode of operation, according to certain embodiments of the invention. The size of the magnets may vary in size, general placement, and strength. For example, regarding size each magnet A/F may cover the entire width of the folio cover 2000, as shown. Alternatively, each magnet A/F may be shorter and cover a smaller distance. In some embodiments, there may be multiple magnets A and multiple magnets F. Any suitable arrangement of magnets may be used to perform the function of holding the folio tablet cover 2000 together in a media mode configuration.

Magnets D and E make up a typing mode system (e.g., a first active configuration) for folio tablet cover 2000, according to an embodiment of the invention. Magnet D can be disposed in a tablet holder 2015 of the folio tablet cover 2000, as shown in both FIGS. 20A and 20B. Magnet D can be disposed on the "south side" 2020 below the keyboard region 2030. Magnets D and E are configured such that they are close enough to each other to be magnetically attracted when the folio tablet cover 2000 is an active media mode state, similar to the tablet cover 100 shown in FIG. 1. Thus, magnets D and E function to hold folio tablet cover 2000 in an active and upright media mode of operation, according to certain embodiments of the invention. The size of the magnets may vary in size, general placement, and strength. For example, regarding size each magnet A/E may cover the entire width of the folio cover 2000, as shown. Alternatively, each magnet A/E may be shorter and cover a smaller distance. In some embodiments, there may be multiple magnets A and multiple magnets E. Any suitable arrangement of magnets may be used to perform the function of holding the folio tablet cover 2000 together in a typing mode configuration.

In some embodiments, the magnets (e.g., A-F) can be configured to provide a magnetic force operable to increase a retention strength of the various operating positions described above. For example, a top holder (e.g., magnet A) and a media mode (e.g, magnet F) magnet(s) can be configured to provide a magnetic force operable to increase a retention strength of the closed position, the retention strength in this example being between the top holder and media mode being related to an amount of force required to break the magnetic bond between the holder and the housing. Furthermore, the first holder (magnet B) and second holder (magnet C) detaching magnets can be configured to provide a magnetic force operable to increase a retention strength of a magnetic bond between the holder and the housing, the retention strength between the first holder and second holder being related to an amount of force required to break the magnetic bond between the holder and the housing. In certain embodiments, both the combination of the top holder and media mode magnets and the combination of the first holder and second holder detaching magnets provide a magnetic force of a magnitude such that the retention strength of each combination is greater than a combined weight of the protective cover and the input device.

In some aspects, an active mode (e.g., magnet D) and typing mode (e.g, magnet E) magnets are configured to provide a magnetic force operable to increase a retention strength of magnetic bond between the holder and the housing in the first active configuration (e.g., typing mode), the retention strength in this example being related to an amount of force required to break the magnetic bond between the holder and the housing in the first active configuration. The active mode and typing mode magnets can be configured to provide a magnetic force of a magnitude such that the retention strength is greater than a combined weight of the protective cover and the input device. The protective cover can further include a second active configuration (e.g., media mode), where the portion of the holder is configured to rest below the plurality of buttons at the first end of the inner portion of the housing such that the holder is configured at an obtuse angle relative to the first end of the inner portion of the housing, the obtuse angle for the second active configuration being larger than the obtuse angle for the first active configuration. The protective cover can also further include an active mode magnet disposed at a bottom of the second end of the housing, and a media mode magnet (e.g., magnet F) disposed at the first end of the inner portion of the housing and below the plurality of keys, the active mode magnet and the media mode magnet configured to secure the holder in the second active configuration. In some implementations, the active mode and media mode magnets are configured to provide a magnetic force operable to increase a retention strength of magnetic bond between the holder and the housing in the second active configuration, the retention strength in this case being related to an amount of force required to break the magnetic bond between the holder and the housing in the second active configuration. The active mode and media mode magnets can be configured to provide a magnetic force of a magnitude such that the retention strength is greater than a combined weight of the protective cover and the input device.

In certain embodiments, alternative types of retention devices can be used in addition to or in lieu of the magnets (e.g., A-F) described above, to secure the housing in one or more of the closed, open, and active configurations (e.g., media mode, typing mode, etc.). The retention devices can include additional magnets, hook and loop fasteners, latches, pins, adhesive, electro-magnets, or any suitable retention device that would be known by one of ordinary skill in the art with the benefit of this disclosure, and any combination thereof. In certain embodiments, the retention strength of the magnets described herein can be reduced when the input device is moved past a threshold angle from the closed or active modes of operation.

Reed Switches

Figure 21:
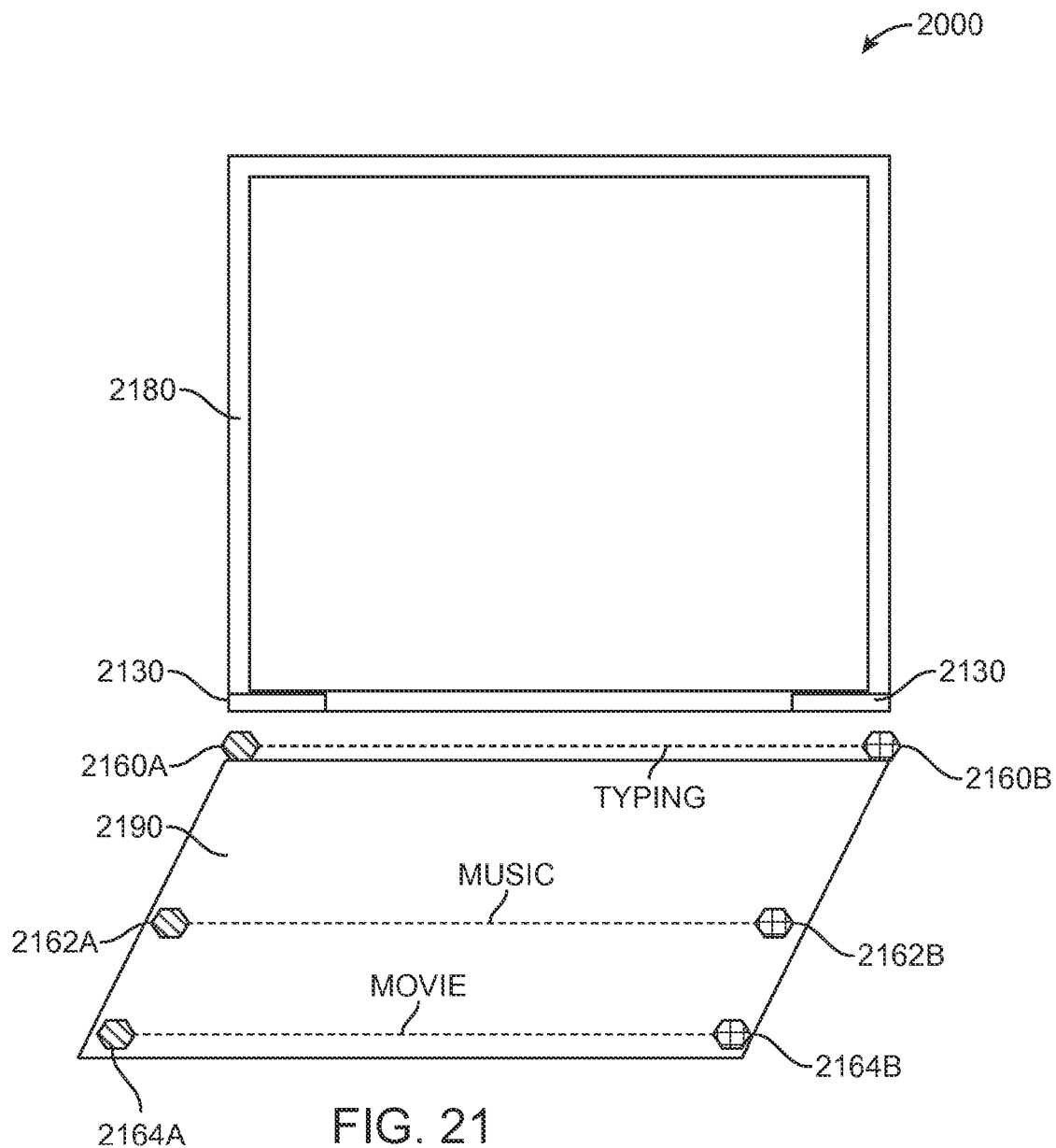
FIG. 21 illustrates a simplified diagram of an operating mode selection system 2100, according to an embodiment of the invention.

FIG. 21 illustrates a simplified diagram of an operating mode selection system 2100, according to an embodiment of the invention. The mode selection system 500 includes a tablet holder 2180, frame 2190, reed sensors 2160, 2162, and 2164. The holder 2180 can have a magnet 2130 disposed therein. According to certain embodiments, reed switch 2160 corresponds to a first mode of operation (e.g., "typing mode"), reed switch 2162 corresponds to a second mode of operation (e.g., "music mode"), and reed switch 2164 corresponds to a third mode of operation (e.g., "movie mode"). In the typing mode, all keys on the keyframe 2190 are accessible. In the music mode, a portion of the keys on frame 2190 are accessible while the others are obscured by the holder 2180 (i.e., the combination of holder 2180 and tablet 105). In some embodiments, the accessible keys in music mode can be operable to perform media control functions (e.g., play, pause, fast forward, etc.). In the movie mode, all of the keys of key frame 2190 in inaccessible because they are obscured by the combination of holder 2180 and tablet 105. Typically, a user may user the movie mode when they simply want to watch media (e.g., a movie) at pleasant viewing angle and do not want to control media playback while the media is playing. In some embodiments, reed switches 2160, 2162, 2164 can be disposed on any suitable surface or structure (e.g., mid-case, top case, PCB, etc.) as would be appreciated by one of ordinary skill in the art.

Reed relays or switches (2160, 2162, 2164) are configured to detect a magnetic field created by the magnet 2130 in the holder 2180. The magnetic field causes the reed relay to close, which in turn can cause a local processor to select the current mode of operation of the folio tablet cover, such as that shown in FIG. 1. For example, if the holder 2180 is positioned at reed relay 2160, the magnetic field created by magnet 2130 can cause the reed relay 2160 to close and communicate with a local processor to indicate that the keyboard is in a first mode of operation (e.g., the "typing" position). In certain cases, the frame 2190 includes reed relays embedded therein, although reed relays can be utilized in any suitable location such that they are operable to determine when holder 2180 is positioned in the various operating mode locations discussed above. The frame 2190 can further include a magnet along the various operating mode locations to help hold the tablet 105 computer in place. However, it should be noted that the extra magnets would have to be arranged such that they do not trigger the reed switches and falsely indicate a mode of operation. Extra magnets can further align holder 2180 with the frame 2190 by magnetically "snapping" the holder 2180 into position on the frame 2190. It should be noted that other types of relays or means of selection can be utilized in the mode selection system 2100 as required. For example, each receiving site may include alternative structures to mechanically, optically, or wirelessly detect the presence of holder 2180 or tablet computer 105 at a particular operating position (i.e., mode of operation). The system 2100 may optionally determine the location of the holder 2180 with respect to the frame 2190 by determining their relative distance from each other with respect to one or more reference points (e.g., optically, wirelessly, etc.). Additional modes and means of detection would be known appreciated by one of ordinary skill in the art.

According to certain embodiments, when holder 2180 is positioned at the "typing" location (i.e., first location or position), similar to the tablet cover 100 of FIG. 1, the keyboard is arranged in an upright position of approximately 60 degrees (i.e., 120 degrees from keyboard to plane of tablet housing) and configured to operate the keyboard in a first mode of operation. In some cases, the keyboard is fully functional and can provide wireless alphanumeric input data to the tablet.

In some aspects, when holder 2180 is positioned at what may be considered as the "music" location (i.e., second location or position), the holder 2180 and tablet computer 105 are arranged in an upright position of approximately 35 degrees (i.e., 145 degrees from keyboard to plane of tablet housing) and configured to operate the keyboard in a second mode of operation. In the second mode of operation, the keyboard is configured to provide various media control capabilities and power saving features. For example, the bottom-most row of keys on the keyboard can be operational and configured to provide wireless media control functions to the tablet computer (e.g., volume control, play/pause, record, fast forward, rewind, next, previous, mute, play picture slideshow, show/hide virtual keyboard, and the like). The remaining keys above the bottom-most row may be rendered inoperable, which may help to conserve power and improve the battery life of the overall system, or could help reduce inadvertent inputs. For example, a user may accidentally press a covered key, or the tablet housing may rest on a number of covered keys, which could result in a stuck key that may drain power or override other key commands, etc. In some embodiments, media keys (not shown) disposed elsewhere on the tablet folio may be activated when holder 2180 is placed in the "music" configuration.

In some embodiments, when holder 2180 is positioned at what may be considered the "movie" location (i.e., third location or position), the keyboard is arranged in an upright position of approximately 25 degrees (i.e., 155 degrees from keyboard to plane of tablet housing) and configured to operate the keyboard in a third mode of operation. In the third mode of operation, some or all of the buttons on the keyboard may be rendered inoperable. In some embodiments, removing the holder 2180 from either the first or second position may turn off the keyboard, or put it into a lower power mode, similar to the third mode of operation. It should be noted that certain embodiments may only utilize two positions and/or two modes of operation. For example, some embodiments may include a typing mode (i.e., first mode) and a music mode (i.e., second mode). Furthermore, the functionality described herein can be supplemented or altered as required. For instance, the "music" mode can be configured to assign any functionality to the first row of keys (e.g., document editing tools, etc.). Further still, different receiving site locations may be used. For example, a particular receiving site location may be configured to provide two user accessible rows of keys with a particular assigned functionality. Other configurations may be implemented as required by the given application. It should be noted that the various mode settings, system functions (e.g., enabling/disabling various features), etc., can be controlled by a system processor, such as processor 2710, as shown in FIG. 27.

Backlight Illumination

Backlighting allows light to pass up and out of a key to illuminate, for example, a character or glyph printed thereon for easy key identification in dimly lit areas. In some embodiments, a backlit key can include a transparent/translucent internal core (PU), plus an external painted shell. In some cases, the shell material can be laser etched away or masked (pad printed), to allow light to shine through from the inner core. Some embodiments generate holes through the fabric in locations where each key may be located. Backlight can be shined through the translucent PU at the fabric opening area. Several fabric processes can be applied to produce the illuminated key on fabric skin. A first process is where you burn the top black paint on a translucent PU (Polyurethane) key by laser etching. A second process is to pad print the key color on transparent TPU file with a contrast white paint for showing character and for light to shine through. Back lighting by laser etching actually burns the paint or ink layer away. This achieves a good result when there is a reflective layer (white or mirror) below the etched layer. The reflective layer can help prevent the laser from burning the layer below.

Figure 22A:
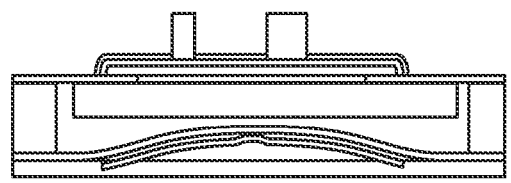
FIGS. 22A-22B illustrate a backlit polyurethane (PU) key with a keyframe structure, according to an embodiment of the invention.

FIG. 22A illustrates a backlit polyurethane (PU) key with a metal-dome structure, according to an embodiment of the invention. The PU key can be composed of a PU skin formed and coupled (e.g., via heat and pressure) to a flexible fabric layer. The flexible fabric layer can be polyurethane, polyester, or other suitable flexible material and can function as a key frame. The fabric layer is configured over top a PC frame to provide key structure, and a dome-array with a light-guide film, to guide light up from the bottom of the key structure up and out of the PU key to illuminate a character printed (e.g., printed, etched, etc.) on the top of the PU key.

Figure 22B:
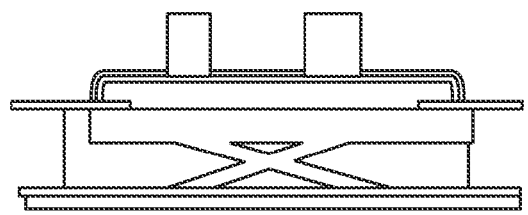

FIG. 22B illustrates a backlit polyurethane (PU) key with a scissor structure, according to an embodiment of the invention. The PU key can be composed of a PU skin formed and coupled (e.g., via heat and pressure) to a flexible fabric layer. The flexible fabric layer can be polyurethane, polyester, or other suitable flexible material, and can function as a key frame. The fabric layer is configured over a scissor key structure with a light-guide film disposed underneath, to guide light up from the bottom of the key structure up and out of the PU key to illuminate a character printed (e.g., printed, etched, etc.) on the top of the PU key.

Figure 23A:
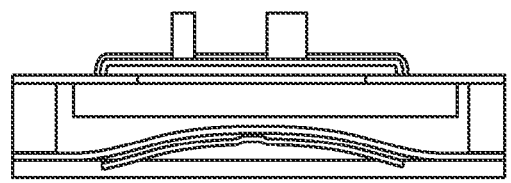
FIGS. 23A-23B illustrate a backlit thermoplastic polyurethane (TPU) key with a keyframe structure, according to an embodiment of the invention.

FIG. 23A illustrates a backlit thermoplastic polyurethane (TPU) key with a metal-dome, according to an embodiment of the invention. The PU key can be composed of a PU skin formed and coupled (e.g., via heat and pressure) to a flexible fabric layer. The flexible fabric layer can be polyurethane, polyester, or other suitable flexible material and can function as a key frame. The fabric layer is configured over top a PC frame to provide key structure, and a dome-array with a light-guide film, to guide light up from the bottom of the key structure up and out of the PU key to illuminate a character printed (e.g., printed, etched, etc.) on the top of the PU key.

Figure 23B:
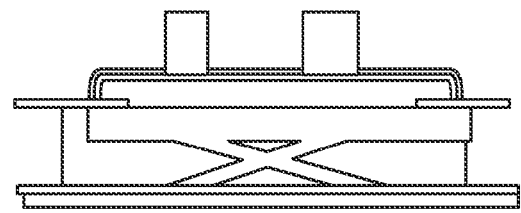

FIG. 23B illustrates a backlit TPU key with a metal-dome, according to an embodiment of the invention. The TPU key can be composed of a TPU skin formed and coupled (e.g., via heat and pressure) to a flexible fabric layer. The flexible fabric layer can be polyurethane, polyester, or other suitable flexible material, and can function as a key frame. The fabric layer is configured over a scissor key structure with a light-guide film disposed underneath, to guide light up from the bottom of the key structure up and out of the PU key to illuminate a character printed (e.g., printed, etched, etc.) on the top of the PU key.

Figure 24A:
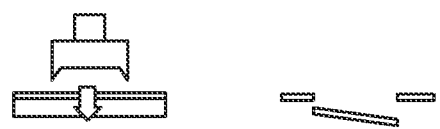
FIGS. 24A-24D illustrate a process of punching fabric for a backlit PU key, according to an embodiment of the invention.

FIG. 24A illustrates a process of punching fabric for a backlit PU key, according to an embodiment of the invention. As described above, the fabric can be a flexible polyester, polyurethane, or other suitable flexible material, and can function as a key frame. As shown in FIG. 24A, the fabric is punched to create a hole in the fabric. This process can be done for every key in a particular keyboard (e.g., alphanumeric QWERTY keyboard, number pad, etc.). The final product is a fabric keyframe with holes punched where key caps will be formed over top. The hole beneath the key cap will provide a conduit (i.e., path, opening) where light can come up from underneath.

Figure 24B:
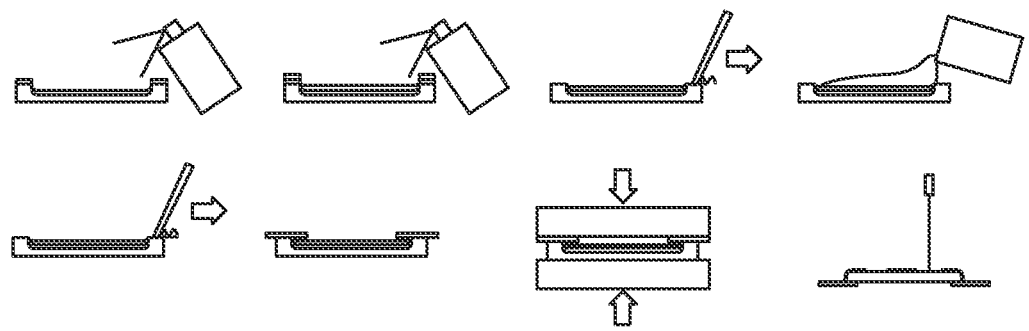

FIG. 24B illustrates a process for PU molding and placement of a key cap, according to an embodiment of the invention. The process begins by spraying black paint into a key cap cavity. The black paint can be made of any suitable compound such as a PU compound. A white paint is then painted in the key cap cavity. The black and white paint will create a good contrast for the letters etched on the key cap. It should be noted that any suitable color can be used and different levels of contrast can be created. Any excess paint is then scraped off to make a clean key cap cavity. A PU clay is then infused into the keycap and the excess stock is scraped off. Thus, the keycap is filled and leveled off for a flat surface at the opening at the top of the edge of the cavity. The punched fabric is then placed over top of the key cap such that the hole is lined up with the center of the key cap to ensure that the backlighting is also centered on the key cap. The fabric and key cap are then pressed in a tool combining heat and pressure to bond and seal the key cap to the fabric without requiring any further bonding agents (e.g., adhesive, glue, etc.). Once the key cap is bonded to the fabric, the key cap is laser etched (from the side opposite of the fabric). The laser engraves the black paint to reveal the white paint underneath and thus form the characters on the key caps. In the present example, the paint is chosen such that light passing through the key (when fully formed) can pass up through the fabric, PU clay, and white paint, but not through the black paint due to its opaque qualities. Thus, only the glyph (character) is lit up. It should be noted that black and white are well suited for keys because of their contrasting color properties. Even without a back light, the white glyphs on black background can be more easily seen in dim environments.

Figure 24C:
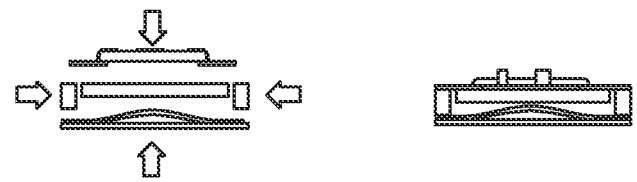

FIG. 24C illustrates a key assembly process using a metal dome structure, according to an embodiment of the invention. The PU and fabric is coupled to a frame and metal dome array with a light guide configured underneath to form the completed key structure. In some cases, the bottom of the fabric is coupled to the frame by a small glue dot (small relative to the surface area of the frame, i.e., <20% of the surface area in size). By using a small glue dot, the fabric can have enough room to flex when depressed without contacting adjacent keys and inadvertently pressing them. In operation, the light guide directs light up into the assembled backlit key structure. The light passes up through the frame structure, through the hole in the fabric centered (or offset) under the key cap, and up through the areas of white paint with the black paint etched away (e.g., via laser etching, chemical processing, or other suitable method).

Figure 24D:
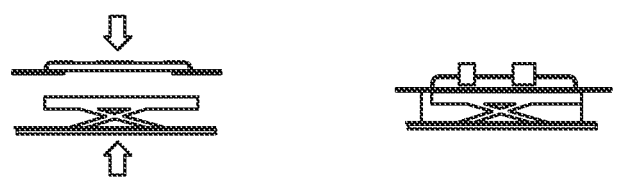

FIG. 24D illustrates a key assembly process using a scissor key structure, according to an embodiment of the invention. The PU and fabric is coupled to a scissor structure with a light guide configured underneath to form the completed key structure. In some cases, the bottom of the fabric is coupled to the scissor structure by a small glue dot (small relative to the surface area of the frame, i.e., <20% of the surface area in size). By using a small glue dot, the fabric can have enough room to flex when depressed without contacting adjacent keys and inadvertently pressing them. In operation, the light guide directs light up into the assembled backlit key structure. The light passes up through the scissor structure, through the hole in the fabric centered (or offset) under the key cap, and up through the areas of white paint with the black paint etched away (e.g., via laser etching, chemical processing, or other suitable method).

Figure 25A:
FIGS. 25A-25D illustrate a process of punching fabric for a backlit TPU key, according to an embodiment of the invention.

FIG. 25A illustrates a process of punching fabric for a backlit TPU key, according to an embodiment of the invention. As described above, the fabric can be a flexible polyester, polyurethane, or other suitable flexible material, and can function as a key frame. As shown in FIG. 25A, the fabric is punched to create a hole in the fabric. This process can be done for every key in a particular keyboard (e.g., alphanumeric QWERTY keyboard, number pad, etc.). The final product is a fabric keyframe with holes punched where key caps will be formed over top. The hole beneath the key cap will provide a conduit (i.e., path, opening) where light can come up from underneath. The TPU can be a translucent TPU compound.

Figure 25B:
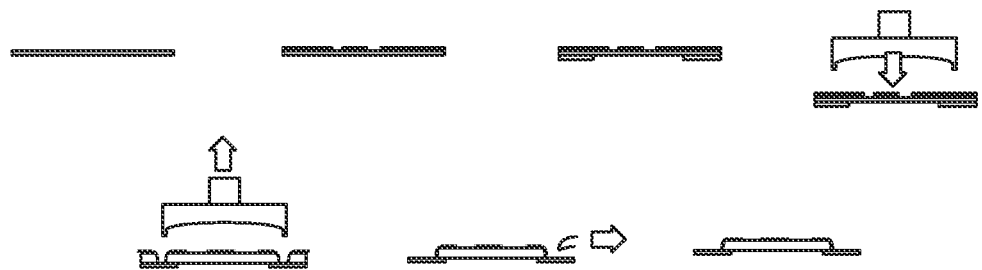

FIG. 25B illustrates a process for hot-pressed TPU molding and placement of a key cap, according to an embodiment of the invention. The molding process starts with a single piece of TPU film. Characters or glyphs are then printed (e.g., or painted, etched, laser marked, etc.) on the TPU film. The printed TPU film is then arranged over the punched fabric. It should be noted that the characters should be printed such they are lined up over each of the holes in the fabric (i.e., centered, offset, etc.). The printed TPU film is then bonded to the fabric by a high frequency welding and cutting machine. During manufacturing, an entire keyboard matrix can be pressed (i.e., welded), one or more rows, groups of keys, or single keys may be bonded at once, which can affect manufacturing throughput and yield. Once the welding tool is removed, the excess TPU stock is removed. For example, some TPU material may exist between the newly formed keys. The extra TPU debris is removed to create a clean keyboard matrix, similar to the keyboard matrix shown in FIG. 27.

Figure 25C:
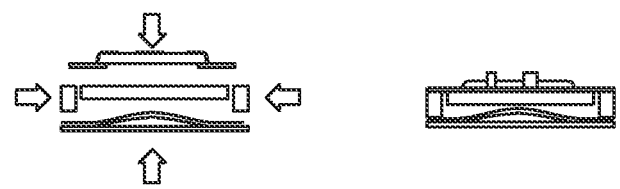
Figure 25D:
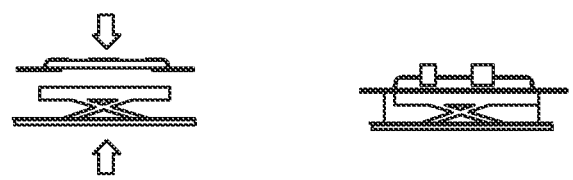

FIG. 25C illustrates a translucent TPU key assembly process using a metal dome structure, according to an embodiment of the invention. The TPU and fabric is coupled to a frame and metal dome array with a light guide configured underneath to form the completed key structure. In some cases, the bottom of the fabric is coupled to the frame by a small glue dot (small relative to the surface area of the frame, i.e., <20% of the surface area in size). By using a small glue dot, the fabric can have enough room to flex when depressed without contacting adjacent keys and inadvertently pressing them. In operation, the light guide directs light up into the assembled backlit key structure. The light passes up through the frame structure, through the hole in the fabric centered (or offset) under the key cap, and up through the translucent TPU key cap.

FIG. 24D illustrates a translucent TPU key assembly process using a scissor key structure, according to an embodiment of the invention. The TPU and fabric is coupled to a scissor structure with a light guide configured underneath to form the completed key structure. In some cases, the bottom of the fabric is coupled to the scissor structure by a small glue dot (small relative to the surface area of the frame, i.e., <20% of the surface area in size). By using a small glue dot, the fabric can have enough room to flex when depressed without contacting adjacent keys and inadvertently pressing them. In operation, the light guide directs light up into the assembled backlit key structure. The light passes up through the scissor structure, through the hole in the fabric centered (or offset) under the key cap, and up through the TPU key cap.

Laser Marking Letters and Numbers on a Flexible Key Cap

Various methods and processes can be used in marking keycaps with characters. Some embodiments provide a laser marking process that can engrave or mark an object such as a keycap using a laser beam. By incorporating laser additives (e.g., dyes) into raw PU, the laser applied on the PU key cap can react with the special additive and cause the physical and/or chemical structure of the PU key cap to be modified. The modified properties of the material in turn causes a color change at the portions of the PU key cap where the laser has been applied. The color change (also referred to as the new color as a result of the laser marking process) can be a combination of the resin's original color and the new additive color activated by the UV laser in some embodiments.

The laser marking process can be tuned to produce the desired color contrast on a keycap surface. By tuning the amount of laser additive to be mixed with raw PU, a mixture of a desired consistency can be obtained. Some embodiments can pour the mixture into a molding tool to form molded keycaps and pre-cure the molded keycaps. After the keycaps are pre-cured or solidified, a fabric layer can be placed over the tool surface with the molded keycaps. A thermal pressing device can press the fabric layer against the tool surface such that the molded keycaps bond against the fabric layer. The keycaps bond against the fabric layer to form a flexible fabric keyboard. After aging the flexible keyboard, some embodiments perform a laser marking process on the flexible keyboard. The laser marking process modifies properties of the material in the keycap at the portions where the laser touches the keycap and thereby causes a color change in those "marked" portions.

PU material can provide a balance between flexibility and strength when incorporated into a fabric layer or a keycap such that an optimal typing force can be enabled in some embodiments. As described, PU can be used in the mixture used to form the keycaps on the fabric keyboard. In order to produce the desired color contrast on PU keycaps and the durability of the printed fonts, a tuned amount of laser additive can be mixed with raw PU. The laser marking process performed upon the molded mixture of the laser additive and PU can produce the desired color and printed font that cannot be easily worn off.

As the laser (e.g., UV laser, fiber UV, IR laser) is applied against the PU keycaps, the characteristics and/or chemical structure of the areas where the laser has "marked" the PU key caps can change, thereby rendering a color change. In some embodiments, laser marking applied on a black PU surface can produce a white or yellow color change at the "marked" portions. Laser marking applied on a white PU surface can produce a black color at the "marked" portions.

Laser marking applied on yellow PU surface can produce a black color change at the "marked" areas. Different amounts of the UV additive incorporated into the PU can cause the color change to vary when the PU is UV marked.

To cause characters, glyphs, and/or icons to be printed on the PU key caps, different laser marking processes can be used. In some embodiments, laser additive (also referred to as specified laser marking additives) can be added into PU to create a mixture. Some embodiments can create a PU key cap by pouring the mixture (e.g., in liquid form) into a mold similarly to the process described in FIG. 9 in forming the PU key caps to be attached to the fabric layer 900. As such, the shape of the PU key caps can be formed. Some embodiments perform the laser marking against the PU key caps subsequent to molding the PU key caps to the fabric layer (e.g., fabric layer 900 in FIG. 9). In certain embodiments, the laser marking can be applied to the PU key caps at a later stage in the manufacturing process.

In order to properly bound the PU key caps onto the fabric layer (made of PU or other fabrics), the temperature of the process needs to be below a threshold temperature level in some embodiments. Using other materials, such as ABS, PC/ABS, HiPS or silicone rubber, on the other hand, would require a much higher temperature, thereby rendering those materials inappropriate for this process. Due to the intrinsic nature and characteristics of the PU material, the PU key cap can be bounded to the flexible fabric cover (e.g., fabric layer 900 in FIG. 9) at a relatively lower temperature.

After the PU key caps are formed (i.e., solidified and cured against a fabric layer), a laser marking process can be used to generate the letters and the numbers on the PU key caps. Some embodiments can apply the laser against the PU key caps. The process in applying the laser against the PU key caps can be recognized by one of ordinary skill in the art. Some embodiments may modify the parameters in applying the laser against the PU key caps based on the characters, the size of the characters, and the distance between the characters. As described, when the laser is applied to the PU key cap (e.g., a black PU key cap), the energy from the laser can change the properties of the PU and cause a color change (e.g., from black to white).

By laser marking the homogenous mixture of materials that includes PU and UV additives, the areas in the PU cap (e.g., at the top of the keys) where the laser is applied can change in color. As described, the laser etching process changes the properties of the mixed material and thereby changes the color. In some embodiments, although a laser-etching process can also be employed, laser marking can cause the color change without requiring the removal of any material from the PU key cap.

The laser marked key caps can be fairly robust and the abrasion rate can be minimized (i.e., the laser marked key caps can be rub-away resistant after many uses). In some embodiments, the abrasion level can withstand more than 1200 times abrasion while rendering little damage to the marked key caps. Additional procedures in hardening the top of the key cap may not be necessary. In some embodiments, the mixture of materials that includes PU and UV additives can be tuned in order to reach the desired color combination (also referred to as the desired color contrast) when UV laser is applied against the mixture.

As described, some embodiments include laser additives into PU and perform a laser marking process to improve the abrasion rate. The combination of applying the laser marking process to the PU key caps, the PU laser marking, the mixture of the PU resin and the laser additives, the appropriate laser source, operating conditions, and parameters including a power level for the laser can enable the laser marking process to produce an effective and highly reliable way to mark the letters and numbers on the key caps. The laser marking conditions (laser source, power, pulse, energy etc.) can be defined in a window, which produce the optimal color contrast (to the keycap PU resin color) and freshness, with clear edge. The desired contrast and coloring can be achieved while improving an overall the abrasion rate for the letters and numbers on the key caps. A contrast against other types of letter printing techniques can be found in FIG. 21.

Icon Sideview—Pyramid/Trapezoidal Shape

Some embodiments can design and construct the folio table cover (e.g., protective cover 100 in FIG. 1) to have a trapezoidal sideview. In some embodiments, a casing of the tablet computer (e.g., BTM case 400 in FIG. 4) can have a trapezoidal shape such that when the folio tablet cover (e.g., protective cover 100 in FIG. 1) is in an operational mode or open position (i.e., when the folio tablet cover is open and the casing is tilted at the angle to face the viewer), one edge of the casing can be placed against the bottom such that the edge of the casing can fit flatly against the bottom. The edge of the casing can serve a stopper such that the casing can be stabilized while the folio tablet cover is in viewing/operational mode. In addition to the tilted edge of the casing, the PU key caps protruding from the fabric layer can serve as an additional stopping mechanism and prevent the edge of the casing from sliding over the keys have Further, the In some embodiments, a magnet right before the location of the key caps can also help keep the edge of the casing in place then the folio tablet cover is in an open position.

Dual Hinged Folio Tablet Cover

In some embodiments, the folio tablet cover may be a dual hinged folio tablet cover. In some embodiments, the folio tablet cover may be a hard shell case with stiff hinges. In some embodiments the folio tablet cover may be made of a plastic material. The folio tablet cover may be configured to hold a top portion of a tablet computer, while a bottom portion of the tablet computer may be disengaged from the folio tablet cover. In other embodiments, the folio tablet cover may be configured to hold the bottom portion of a tablet computer, while the top portion of the tablet computer may be disengaged from the folio tablet cover.

Figure 27A:
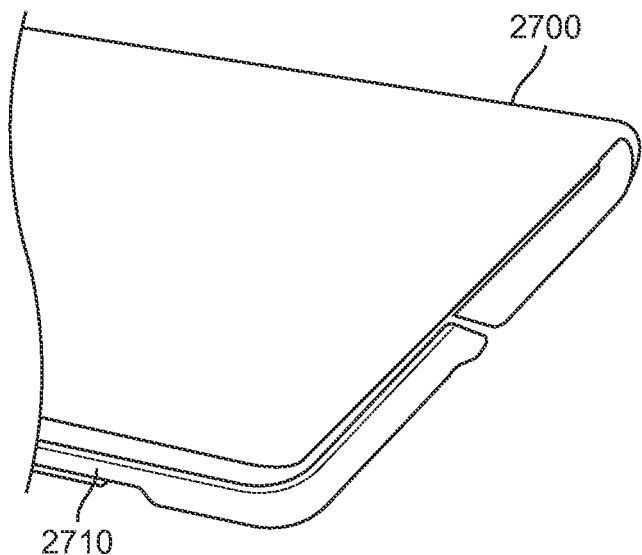
FIG. 27A illustrates a folio tablet cover, according to an embodiment of the invention.

FIG. 27A illustrates a folio tablet cover 2700, according to an embodiment of the invention. In the embodiment shown, the folio tablet cover 2700 is wrapped in material (i.e., silicon or fabric). In other embodiments, the folio tablet cover 2700 may not wrapped in any material. In such embodiments, the folio tablet cover 2700 may be a hard plastic case. The folio tablet cover 2700 depicted in FIG. 27A is in a closed position with a tablet computer 2710 attached.

Figure 27B:
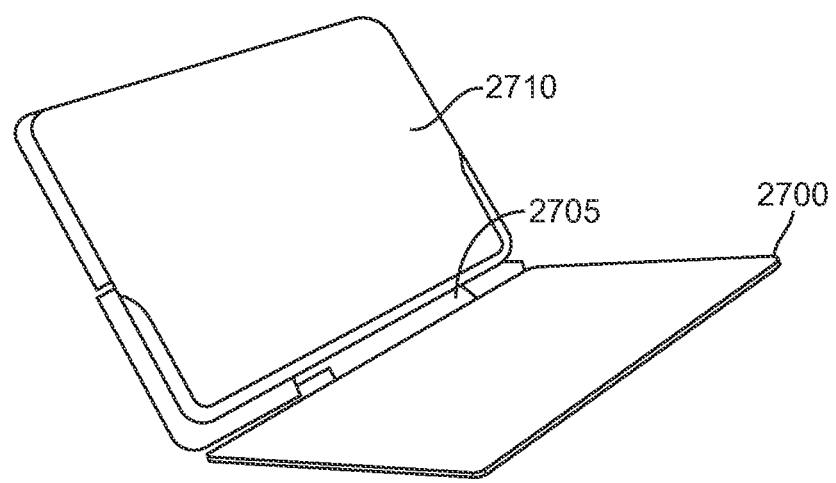
FIG. 27B illustrates a folio tablet cover in an opened position with the tablet computer attached, according to an embodiment of the invention.

FIG. 27B illustrates the folio tablet cover 2700 in an opened position with the tablet computer 2710 attached, according to an embodiment of the invention. The folio tablet cover 2700 may be moved from a closed position to an open position by a first hinge 2705. In some embodiments, the first hinge 2705 is a double hinge that allows for a wide angle of rotation.

Figure 28:
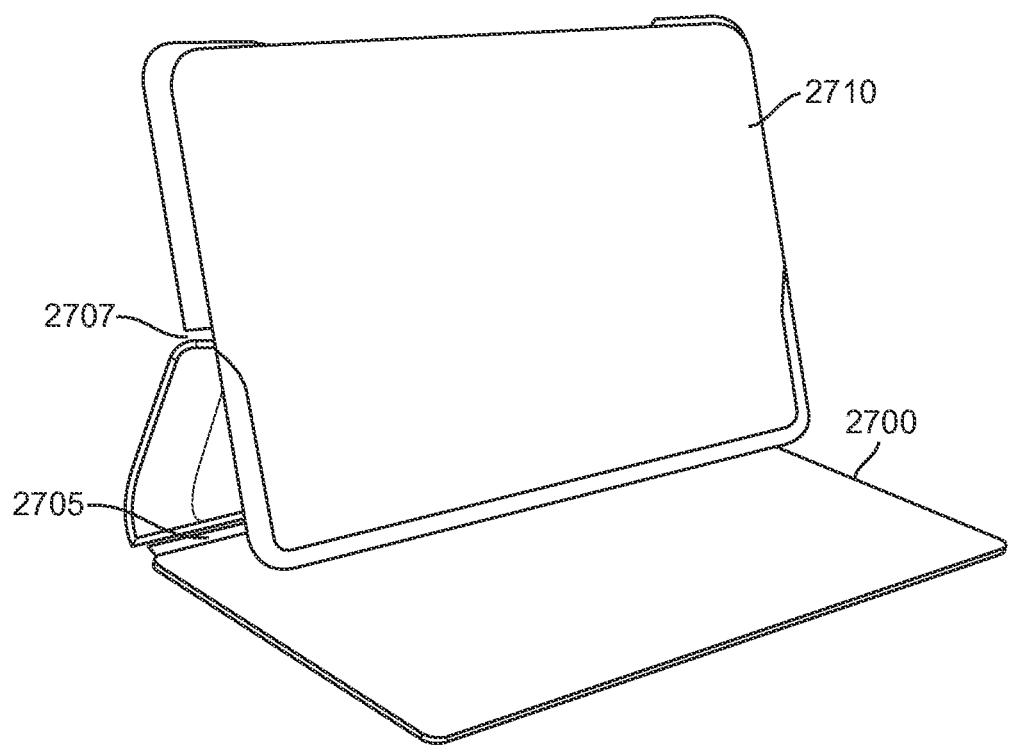
FIG. 28 illustrates a folio tablet cover with a tablet computer in a portrait position.

FIG. 28 illustrates the folio tablet cover 2700 with a tablet computer 2710 in a portrait position. Such embodiments allow the tablet computer 2710, engaged to the folio tablet cover 2700, to be viewed in an upright position. In such embodiments, a keyboard component may be housed in the bottom portion of the folio tablet cover 2700. In some embodiments, the bottom portion of the folio tablet cover 2700 may comprise a slot that may allow for interchangeable components (e.g., keyboards) to be inserted into the slot. The position depicted in FIG. 28 involves both the first hinge 2705 and a second hinge 2707. The second hinge 2707 may be a single hinge. The second hinge may be configured to allow for the tablet computer 2710 attached to the folio tablet cover 2700 to be oriented in a plurality of different positions. In this embodiment, the first hinge 2705 has been rotated approximately 60 degrees from the closed position depicted in FIG. 27A, and the second hinge 2707 has been rotated approximately 25 degrees more than the first hinge 2705. In this configuration, the bottom portion of the tablet computer 2710 is engaged to the folio tablet cover 2700.

Figure 29A:
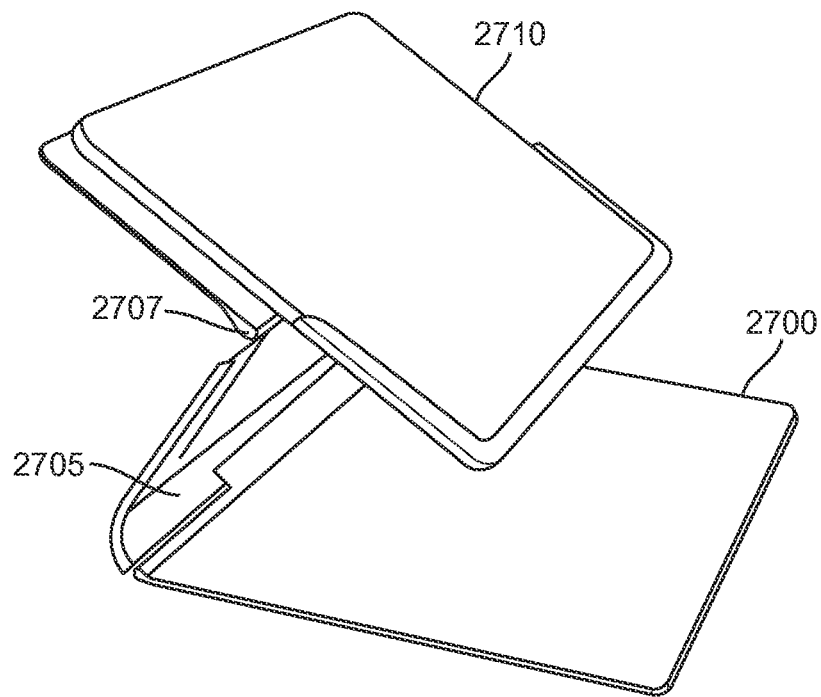
FIGS. 29A-29B illustrate alternate views of a folio tablet cover with the tablet computer, according to an embodiment of the invention.
Figure 29B:
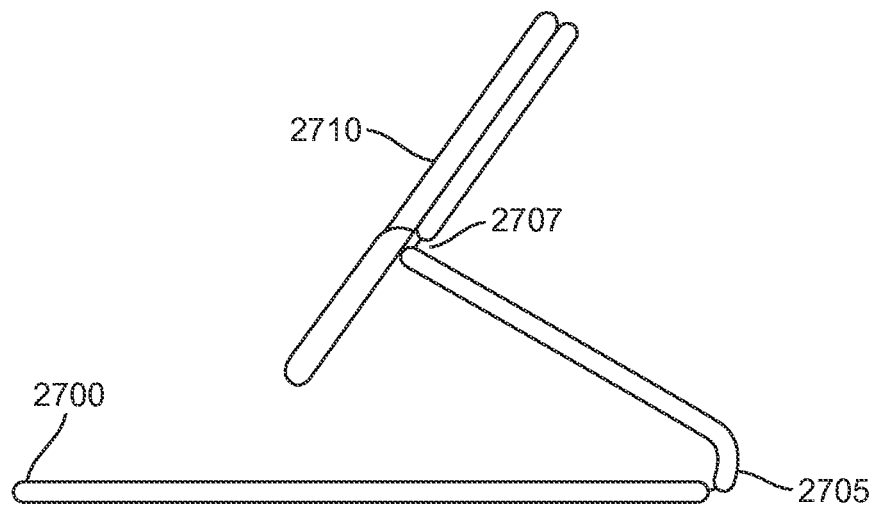

FIGS. 29A and 29B illustrate alternate views of the folio tablet cover 2700 with the tablet computer 2710, according to an embodiment of the invention. In FIGS. 29A and 29B, the folio tablet cover 2700 is arranged in a "floating" position where the tablet computer 2710 is engaged to the folio tablet cover 2700, while the bottom edge of the tablet computer 2710 is elevated off the bottom portion of the folio tablet cover 2700 and remains suspended in that position. The first hinge 2705 and the second hinge 2707 are positioned to allow the tablet computer to be lifted off the bottom portion of the folio tablet cover 2700 and supported by the upper portion of the folio tablet cover 2700, the first hinge 2705 and the second hinge 2707.

Figure 30A:
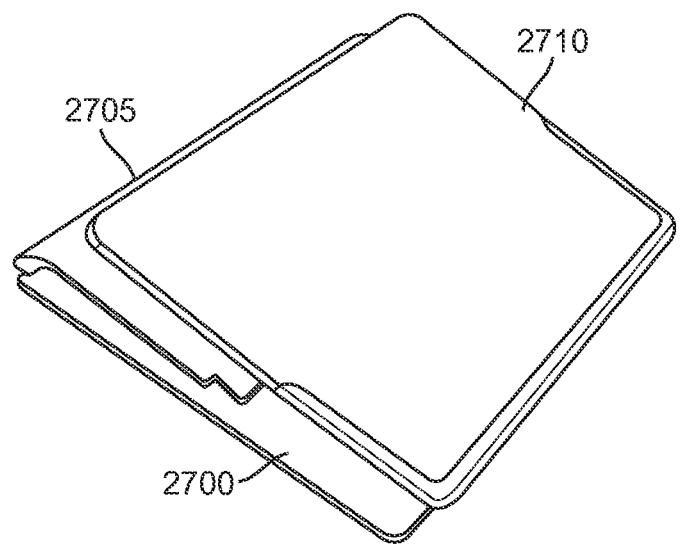
FIGS. 30A-30B illustrate alternate positions for a tablet computer in the folio tablet cover, according to an embodiment of the invention.

FIG. 30A illustrates an alternate position for the tablet computer 2710 in the folio tablet cover 2700, according to an embodiment of the invention. In this embodiment, the first hinge 2705 is rotated such that the tablet computer 2710 has been rotated approximately 360 degrees from the closed position depicted in FIG. 27A. In FIG. 30A, the outer sides of the folio tablet cover 2700 are in contact with each other.

Figure 30B:
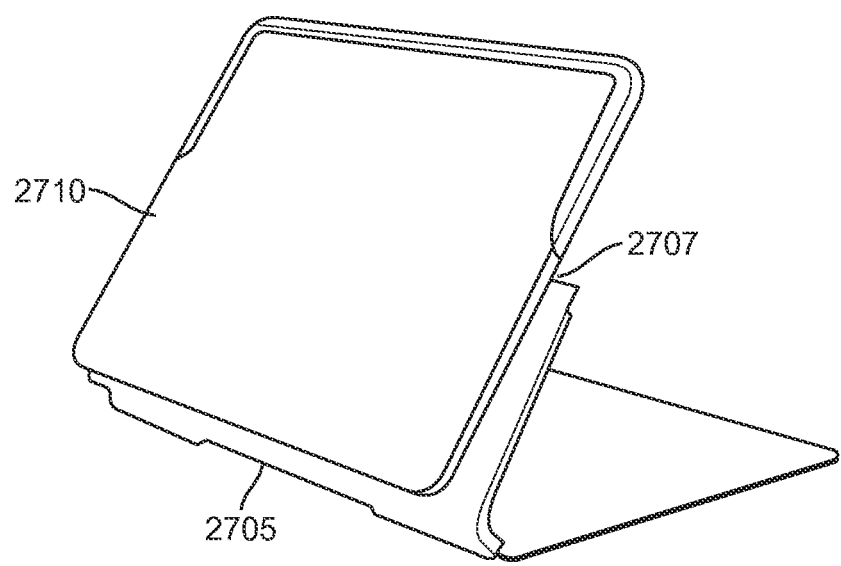

FIG. 30B illustrates an alternate position for the tablet computer 2710 in the folio tablet cover 2700, according to an embodiment of the invention. In this embodiment, the first hinge 2705 is rotated such that the tablet computer 2710 has been rotated approximately 315 degrees from the closed position depicted in FIG. 27A.

Figure 31:
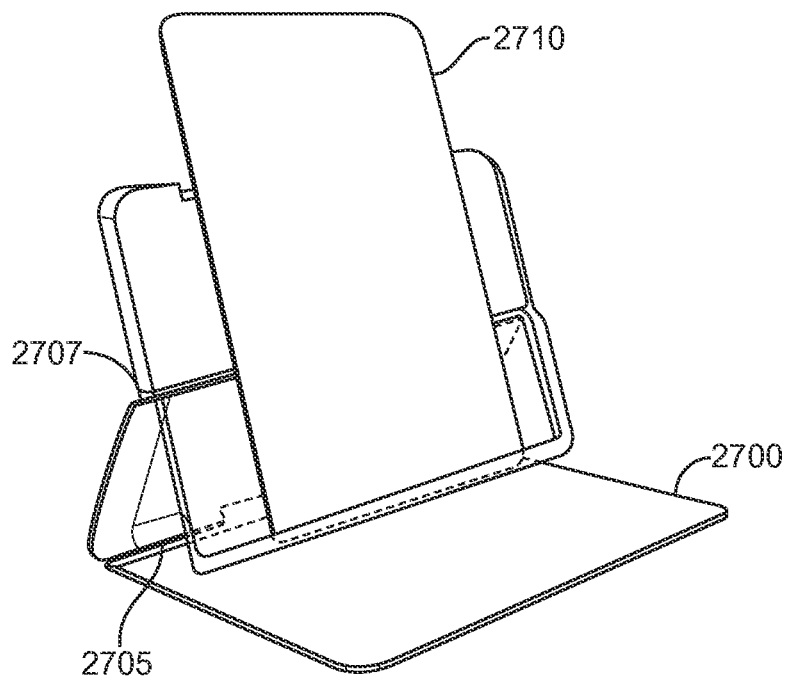
FIG. 31 illustrates an alternate position for a tablet computer in a folio tablet cover, according to an embodiment of the invention.

FIG. 31 illustrates an alternate position for the tablet computer 2710 in the folio tablet cover 2700, according to an embodiment of the invention. In this embodiment, the tablet computer 2710 has been oriented into a portrait position. The orientation of the first hinge 2705 and the second hinge 2707 is similar to that described with respect to FIG. 28.

Figure 32A:
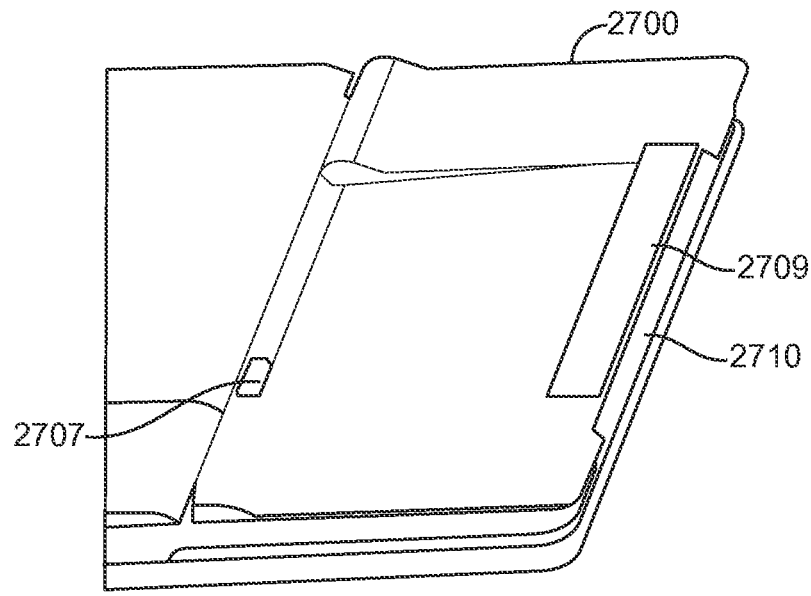
FIG. 32A illustrates a magnet in the folio tablet cover to secure the tablet computer when the folio tablet cover is in the closed position, according to an embodiment of the invention.

FIG. 32A illustrates a magnet 2709 in the folio tablet cover 2700 to secure the tablet computer 2710 when the folio tablet cover 2700 is in the closed position, according to an embodiment of the invention. In some embodiments, the magnet 2709 is positioned to magnetically attract the tablet computer 2710 to prevent the tablet computer 2710 from sliding from the folio tablet cover 2700.

Figure 32B:
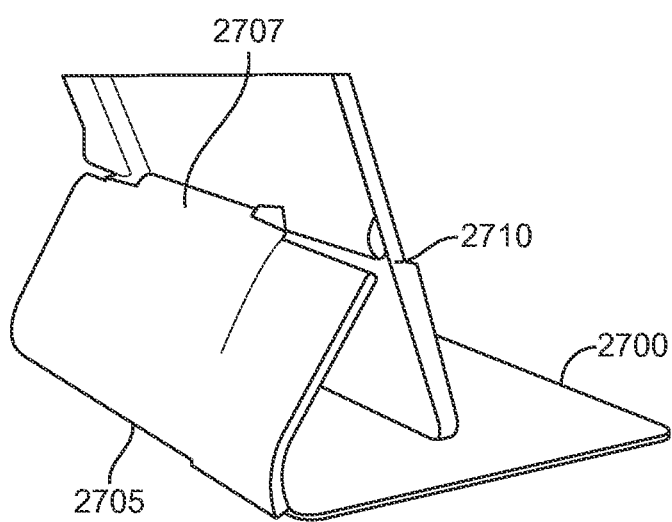
FIG. 32B illustrates additional feature of the folio tablet cover, according to an embodiment of the invention.

FIG. 32B illustrates additional feature of the folio tablet cover 2700, according to an embodiment of the invention. The bottom portion of the folio tablet cover 2700 may include a keyboard component. In some embodiments, the keyboard component is composed of a plurality of input members that may be metal domes with hinge key caps. In some embodiments, the upper portion of the folio tablet cover 2700 may store a power supply (i.e., battery) to provide additional functionality.

One of the benefits of some embodiments of the invention is the ability to orient the protective cover into a variety of different positions such that a screen of the tablet computer can be visible to the user. In such embodiments, the user can adjust the position and angle of the protective cover rather than having to adjust their own position to get a better angle on the screen.

System Level

FIG. 33 is a simplified block diagram of an exemplary system 3300 configured to operate the various protective cover systems discussed herein, according to certain embodiments of the invention. The system 3300 includes a processor 3310, a power management system 3320, a photovoltaic element 3330 (e.g., solar cell, solar panel), a power supply (e.g., batteries, rechargeable batteries, accumulator(s)) 3340, an output device 3350, a keyboard matrix 3360, a communications block 3370, and configuration detection system 3380. Each of the system blocks 3320-3370 are in electrical communication with the processor 3310. System 3300 may further include additional systems (e.g., audio systems, touch screen input/outputs, etc.) that are not shown or discussed to prevent obfuscation of the novel features described herein. Similarly, some systems 3300 may include fewer systems (e.g., no photovoltaic elements, no keyboard, etc.) as required by design.

In certain embodiments, the processor 3310 comprises one or more microprocessors (μCs) and is configured to control the operation of system 3300. Alternatively, the processor 3310 may include one or more microcontrollers (MCUs), digital signal processors (DSPs), or the like, with supporting hardware/firmware (e.g., memory, programmable I/Os, etc.), as would be appreciated by one of ordinary skill in the art. The processor 3310 can be configured to operate the protective cover systems (or more generally, an input device) described herein. In some embodiments, the processor controls and communicates with the reed switches of FIG. 21. The processor 3310 can determine the current mode of operation based on reed switches (i.e., which reed switch detects the tablet computer 105).

In certain embodiments, the power management system 3320 of system 3300 is configured to manage power distribution, recharging, power efficiency, and the like. The power management system 3320 can control the power distribution by the batteries 3340 and photovoltaic (PV) panel 3330. The PV panel 3330 can provide energy to the batteries (e.g., 2 AAA cells) when submitted to a light source. It should be noted that any number of management features may be used as required and would be appreciated by one of ordinary skill in the art.

The communications system 3370 is configured to provide wireless communication between the various protective cover systems described herein and a mobile input device (e.g., tablet computer), according to an embodiment of the invention. The communications system 3370 can be controlled by the processor 3310 and configured to provide radio-frequency (RF) communication with any of a wide variety of wireless communication protocols including, but not limited to, Bluetooth, WiFi and infra-red wireless systems. The various protective cover systems may optionally comprise a hardwired connection to their associated input devices. For example, the system 3300 may provide a Universal Serial Bus (USB) cable to provide electronic communication to the attached input device or other external devices. Other embodiments of the invention may utilize different types of cables or connection protocol standards to effectuate a hardwired communication with outside entities. In one non-limiting example, a USB cable can be used to provide power to a protective cover to charge the batteries 3340 and simultaneously support data communication between the system 3300 and the input device.

In some embodiments, the processor 3310 integrates processing and RF communication functions, in addition to scanning and controlling the keyboard matrix 3360 and/or other input devices, monitoring configuration detection mechanisms 3380 (e.g., the relay switches, etc., used to detect keyboard modes, media button modes, closed configurations, etc.), controlling LEDs (not shown) and the like. The keyboard matrix 3360 can include a mechanical keyboard disposed in the protective cover. User inputs to the keyboard matrix can be wirelessly coupled to the tablet computer by way of the processor 3310 and communication system 3370. The keyboard 3360 can include a key frame disposed therein (not shown) including a means of configuration detection. For example, relay switches (not shown) can be activated by a protective cover frame to determine when the keyboard is configured in the various operations modes of operation, as further described below. Alternatively, the keyboard matrix 3360 may be configured in a non-conventional format (e.g., number pad, application-specific key arrangements, or other grouping of a number of buttons). The individual keys may be mechanical (e.g., scissor keys, plunger keys, etc.), soft keys on a display, or other suitable type of input interface.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. An apparatus comprising:
a set of key structures disposed on a support base fixedly attached to an intermediate layer;
a first set of key caps disposed on the set of key structures;
a flexible fabric having a top and bottom surface, wherein a top of each of the first set of key caps is coupled to the bottom surface of the flexible fabric, and wherein the flexible fabric is entirely planar over an area defined by the set of key structures; and
a second set of key caps disposed on the top surface of the flexible fabric, wherein each of the set of key structures, the first set of key caps, and the second set of key caps are vertically aligned.

2. The apparatus of claim 1, wherein the flexible fabric is bonded to the first set of key caps by an adhesive disposed on the flexible fabric at locations corresponding to each of the key caps in the first set of key caps, and wherein the flexible fabric is bonded with a top case to form a flexible fabric layer.

3. The apparatus of claim 2, wherein the flexible fabric layer is held in tension.

4. The apparatus of claim 2, wherein the flexible fabric layer deforms when the key cap is depressed.

5. The apparatus of claim 1, wherein the key structures are input keys capable of providing instructions to a computing device.

6. The apparatus of claim 1, wherein the intermediate layer further includes one or more circuit boards, power sources, and magnets.

7. The apparatus of claim 6, wherein an amount of adhesive disposed on the flexible fabric is sufficient to bond to the first set of key caps to the second set of key caps, and wherein pressing on one of the key caps in the second set of key caps does not affect more than the one of the key caps in the first set of key caps affixed to the pressed key cap.

8. The apparatus of claim 1, wherein the second set of molded key caps disposed on the flexible fabric do not pass through the flexible fabric.

9. The apparatus of claim 1, wherein the intermediate layer is affixed to a housing.

10. The apparatus of claim 1, wherein a holder affixed to the flexible fabric is configured to hold a computing device.

11. The apparatus of claim 1, wherein the second set of key caps disposed on the flexible fabric are comprised of a flexible material.

12. The apparatus of claim 11, wherein the flexible material of the second set of key caps disposed the flexible fabric is a polyurethane (PU).

13. The apparatus of claim 12, wherein the flexible material of the second set of key caps is made of a different material than the flexible fabric layer.

* * * * *